United States Patent [19]
Matsuda et al.

[11] Patent Number: 6,055,067
[45] Date of Patent: Apr. 25, 2000

[54] IMAGE PROCESSING APPARATUS HAVING FACSIMILE FUNCTION

[75] Inventors: Yoji Matsuda; Toshiharu Takahashi, both of Kawasaki; Takefumi Nosaki, Odawara, all of Japan

[73] Assignee: Kabushiki Kaisha Toshiba, Kawasaki, Japan

[21] Appl. No.: 08/766,338

[22] Filed: Dec. 16, 1996

[30] Foreign Application Priority Data

Dec. 20, 1995 [JP] Japan .................................. 7-331998

[51] Int. Cl.⁷ ............................ H04N 1/32; H04N 1/00
[52] U.S. Cl. .................................... 358/468; 358/404
[58] Field of Search .................... 358/468, 444, 358/404, 403, 400, 442, 448, 296, 407, 434, 437; 379/100.01, 102.06; 395/114, 112, 101, 109, 115, 116

[56] References Cited

U.S. PATENT DOCUMENTS

| | | | |
|---|---|---|---|
| 4,887,164 | 12/1989 | Takahashi | 358/443 |
| 5,220,438 | 6/1993 | Yamamoto | 358/404 |
| 5,325,209 | 6/1994 | Manabe | 358/437 |
| 5,353,406 | 10/1994 | Mikuni | 395/165 |
| 5,361,134 | 11/1994 | Hu et al. | 358/296 |
| 5,371,574 | 12/1994 | Ohmura et al. | 355/208 |
| 5,379,124 | 1/1995 | Ikegaya et al. | 358/440 |
| 5,396,341 | 3/1995 | Takahashi et al. | 358/400 |
| 5,410,419 | 4/1995 | Maramatsu et al. | 358/468 |
| 5,537,218 | 7/1996 | Negi | 358/404 |
| 5,675,422 | 10/1997 | Hara et al. | 358/404 |
| 5,694,226 | 12/1997 | Yokoyama | 358/468 |
| 5,710,843 | 1/1998 | Tsukamoto et al. | 382/305 |

FOREIGN PATENT DOCUMENTS

| | | |
|---|---|---|
| 0 175 385 | 3/1986 | European Pat. Off. . |
| 7-221999 | 8/1995 | Japan . |

*Primary Examiner*—Edward L. Coles
*Assistant Examiner*—Madeleine AV Nguyen
*Attorney, Agent, or Firm*—Foley & Lardner

[57] ABSTRACT

In a multifunction image processing apparatus, a CPU uses a QNT/PM, as used for copying and editing, to store image data received by a facsimile controller during a time zone when the apparatus is not used for other than facsimile reception, as in the night. In initiating an operation other than facsimile reception, such as copying, the CPU allows the image data retained in the QNT/PM to be printed out by a laser printer. In the event of failure to print, or in the case of confidential data, the image data is stored/retained in a file memory in a facsimile controller.

5 Claims, 18 Drawing Sheets

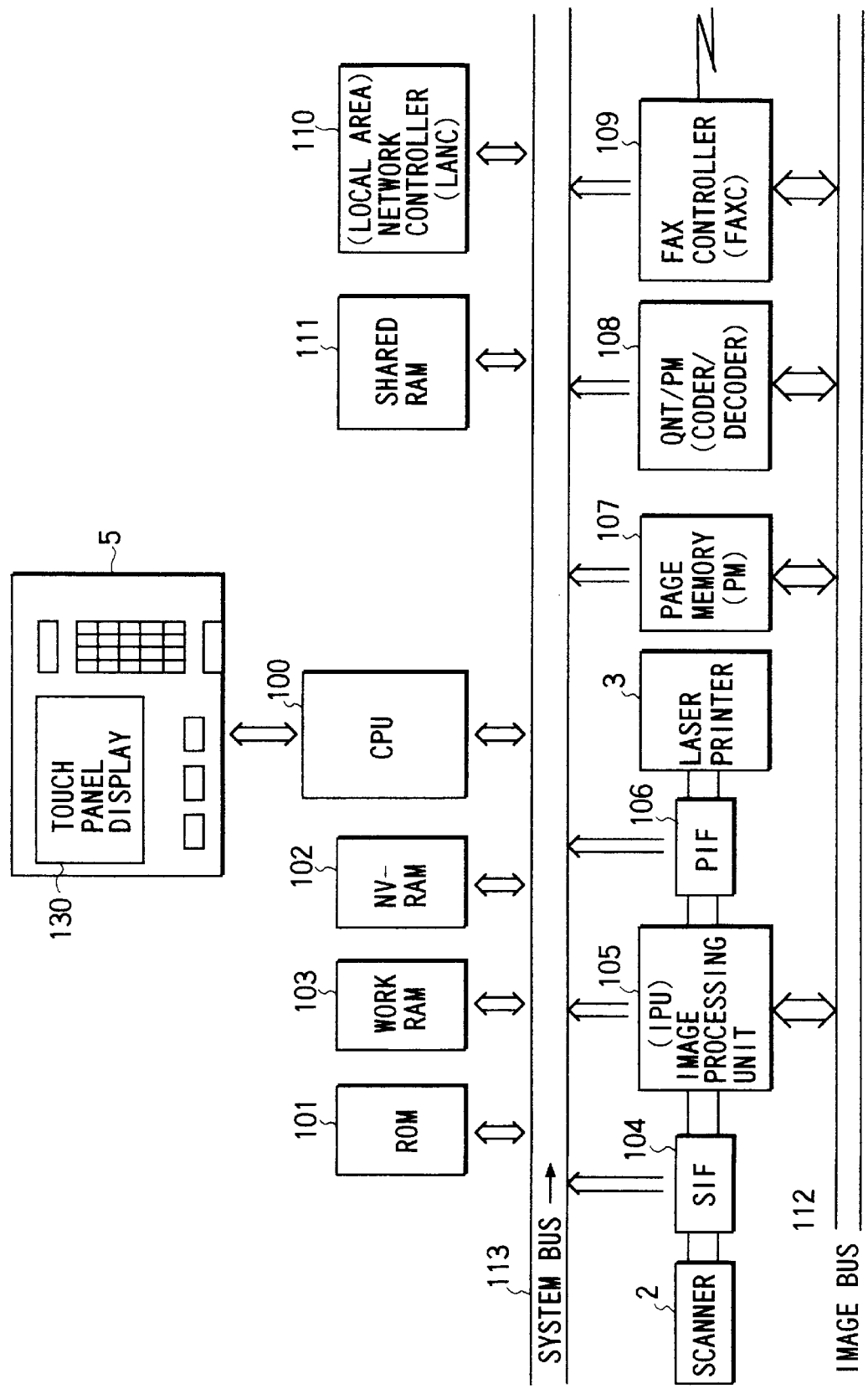
F I G. 1

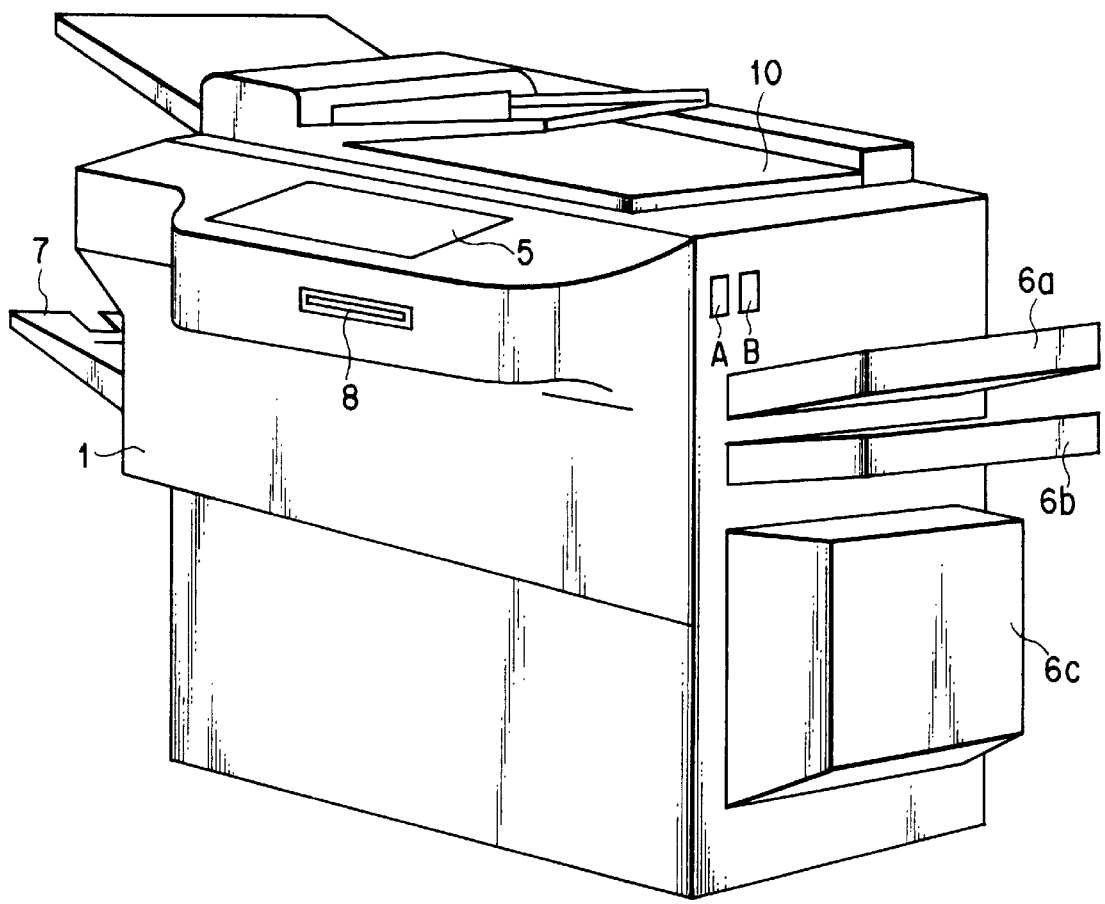
F I G. 2

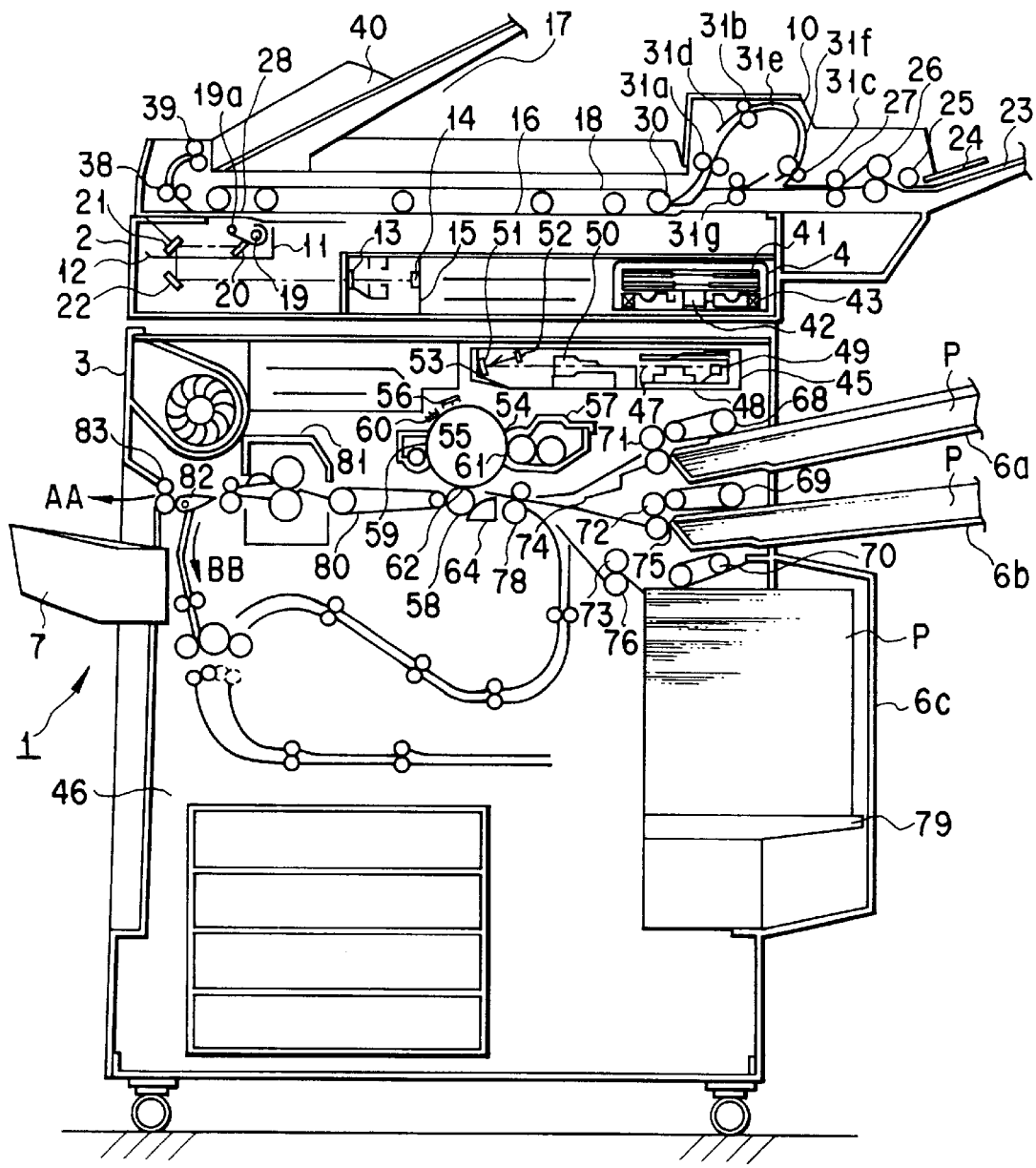
F I G. 3

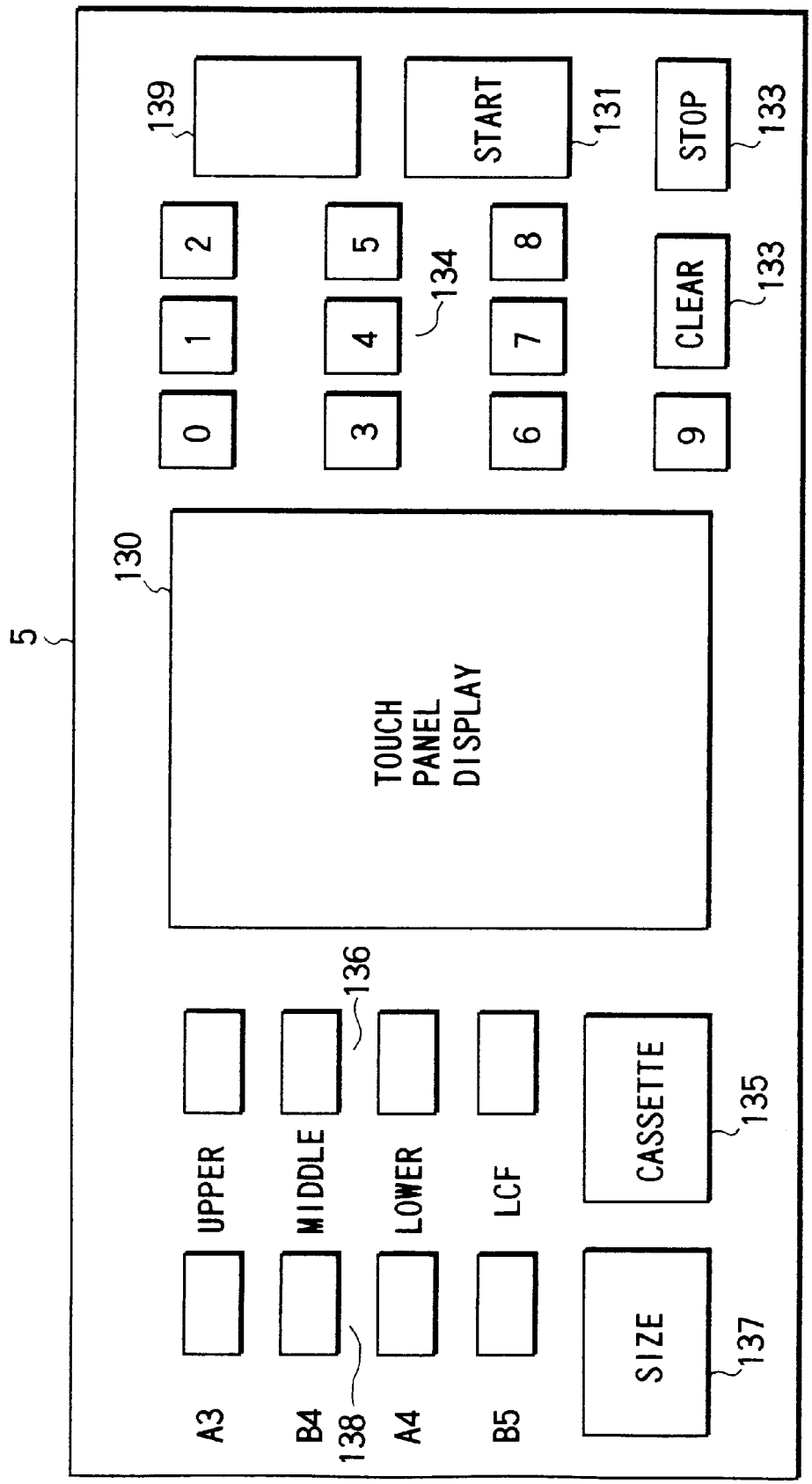
F I G. 5

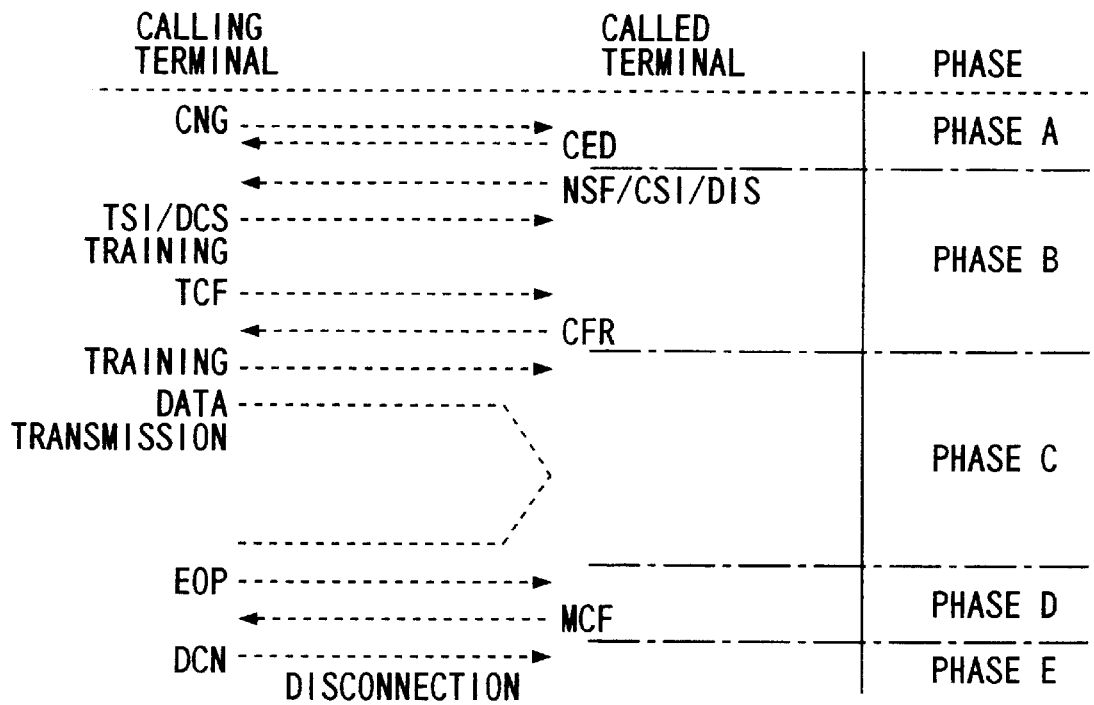
F I G. 7
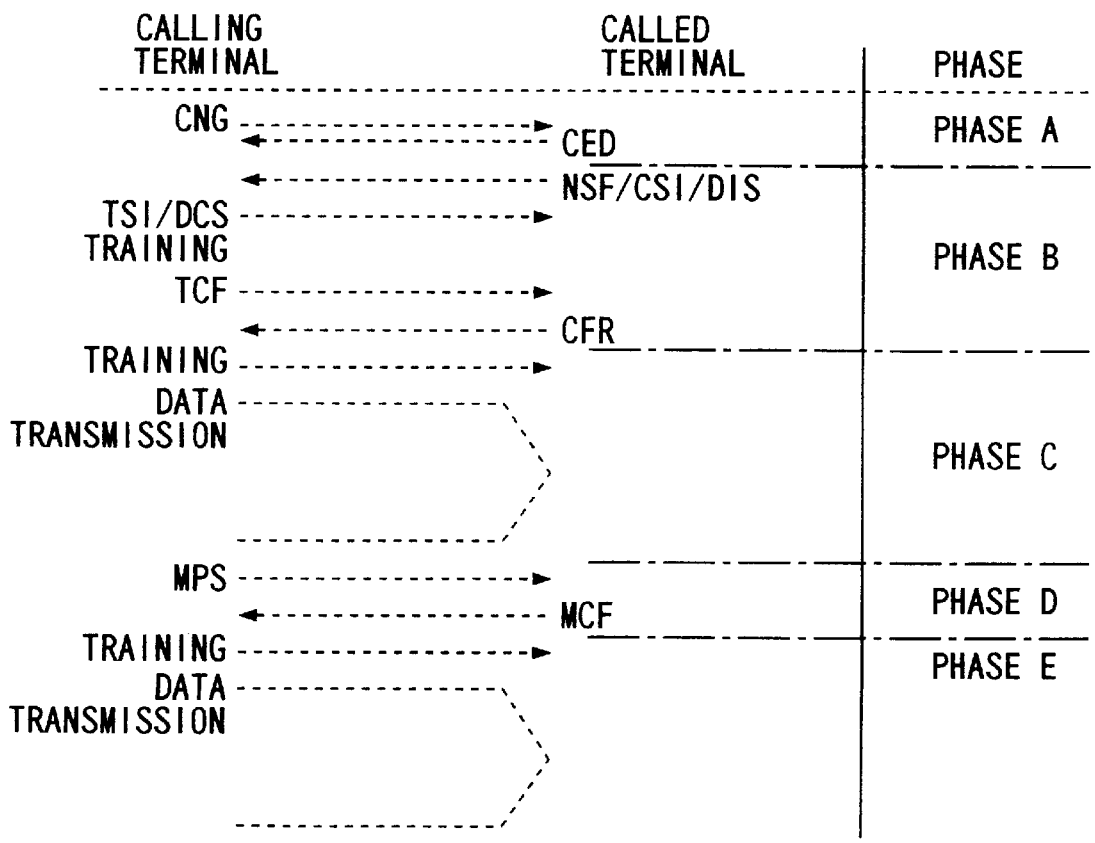
F I G. 8

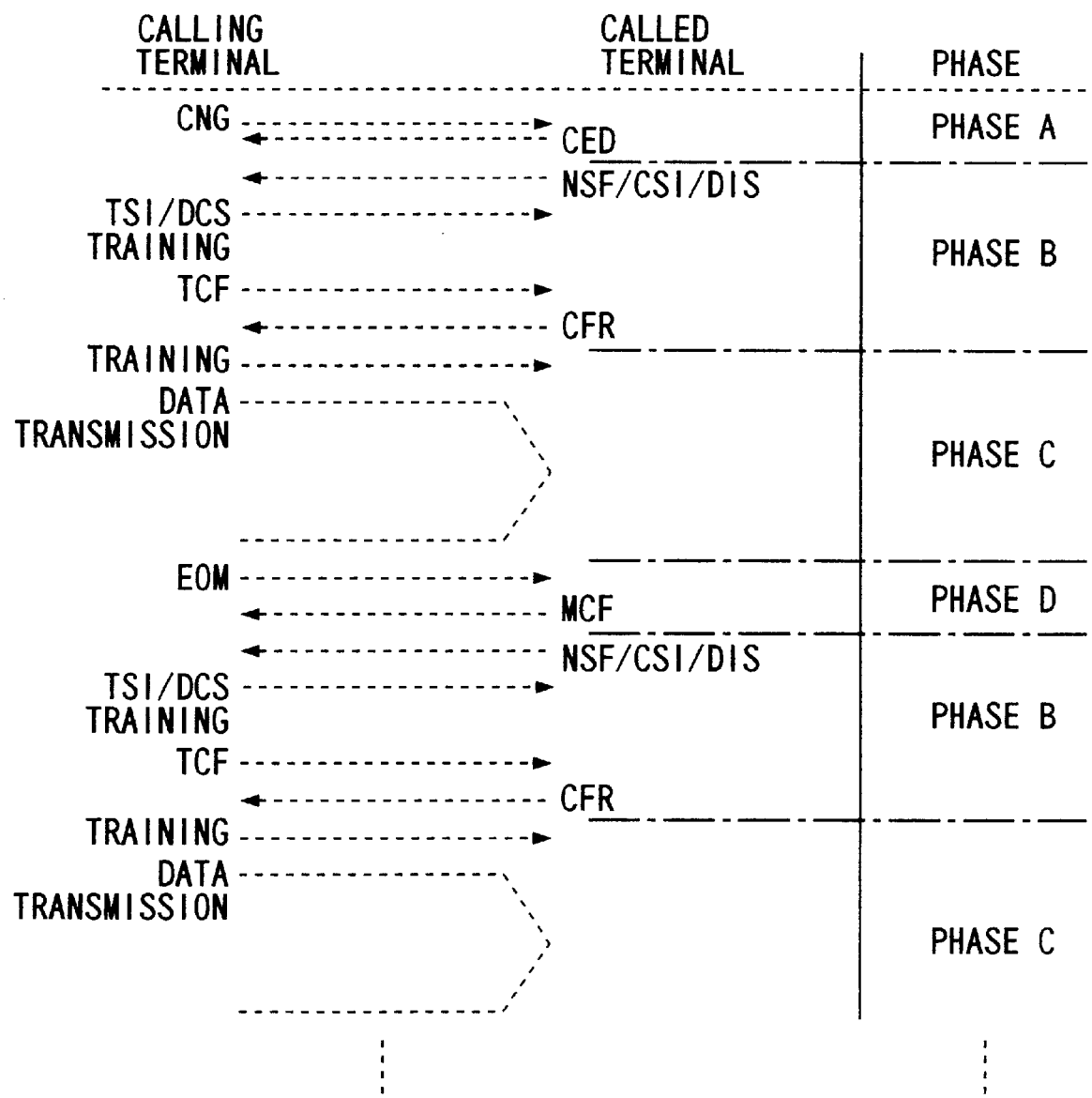
F I G. 9

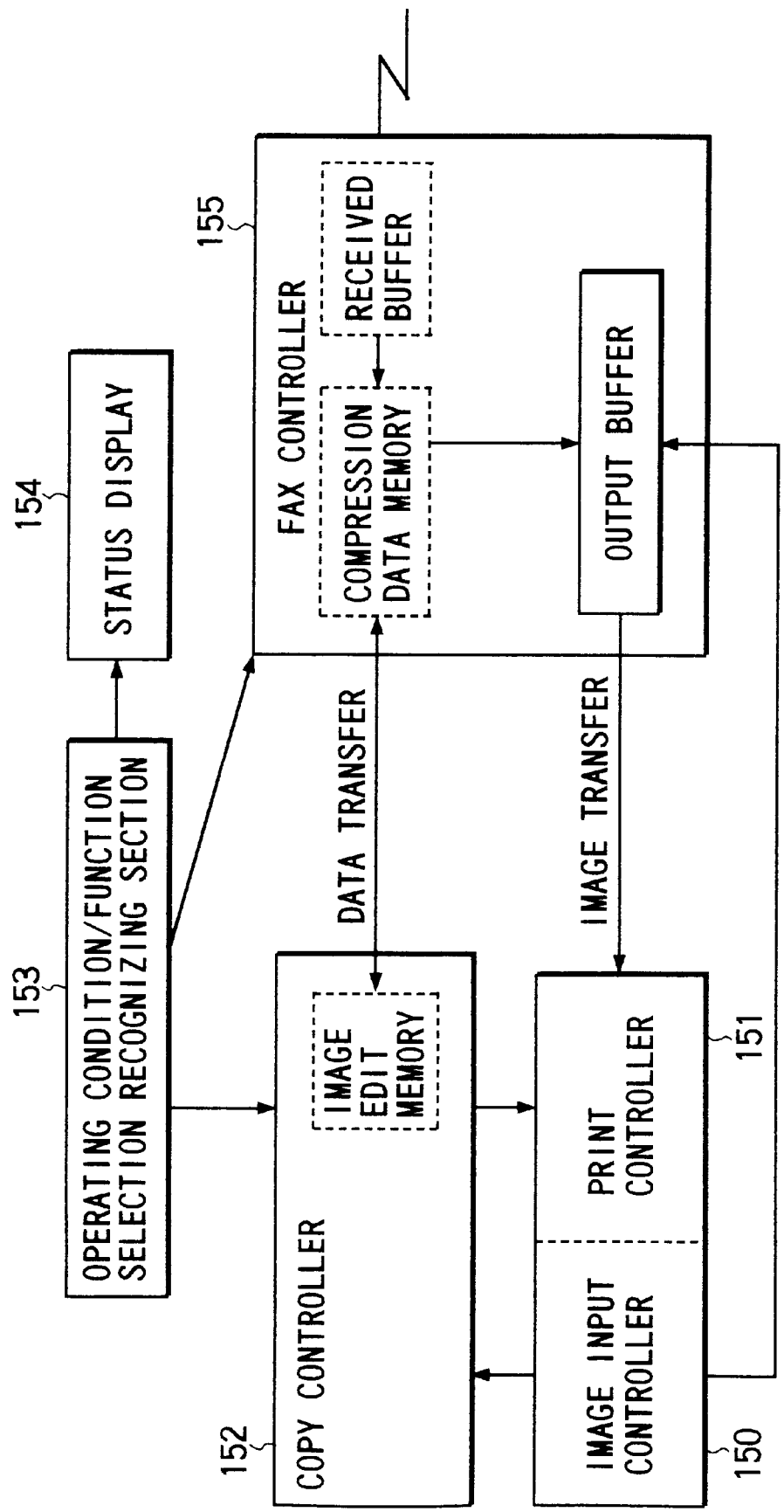
F I G. 10

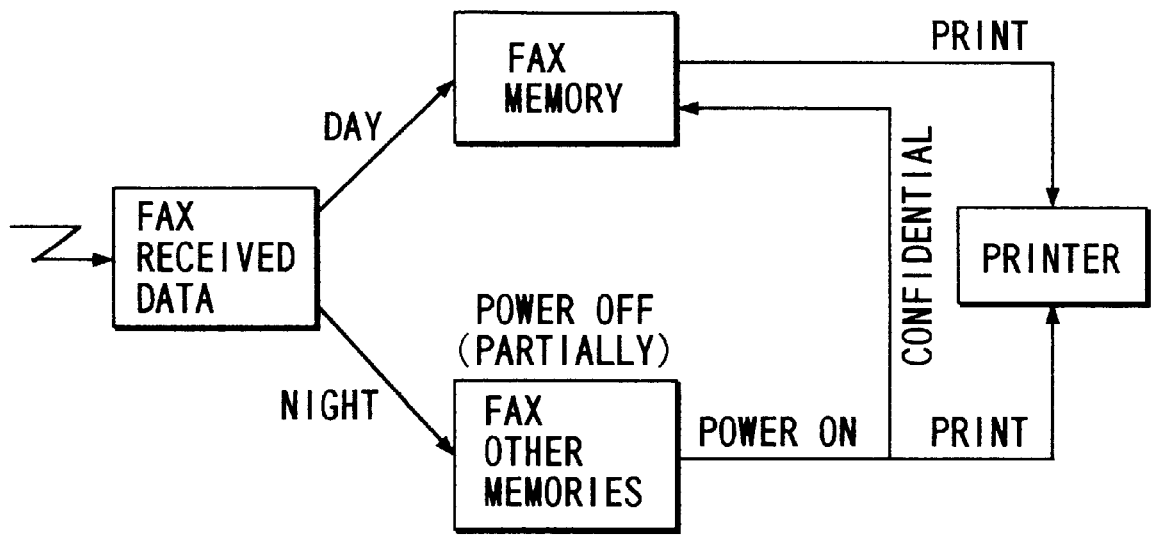
F I G. 12
<INTERCEPT SETTING>
TIME SETTING ····· [ON]  OFF
STARTING TIME ····· 23:00
ENDING TIME ····· 9:00
<CONFIRM>  <CANCEL>
130
F I G. 14

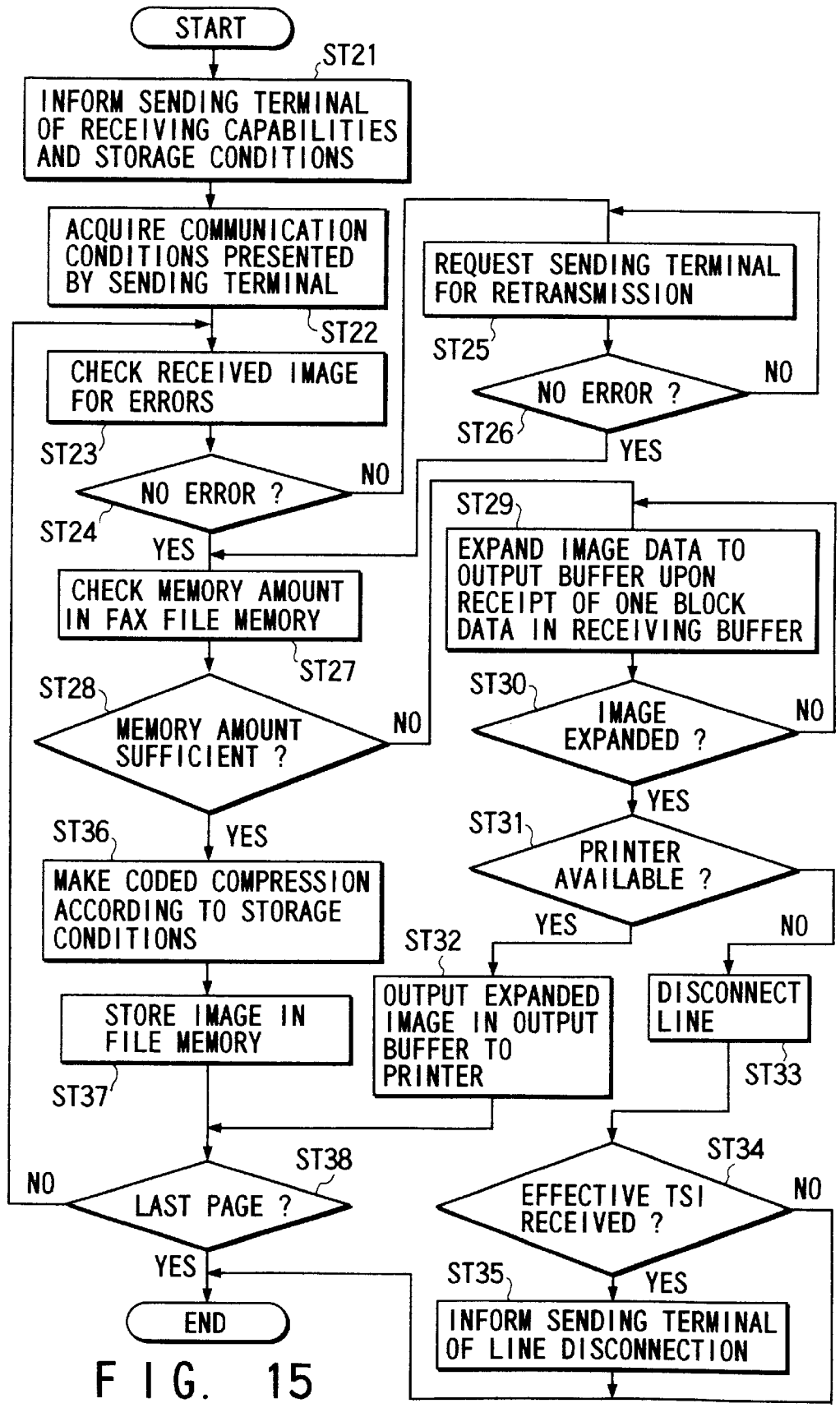
F I G. 15

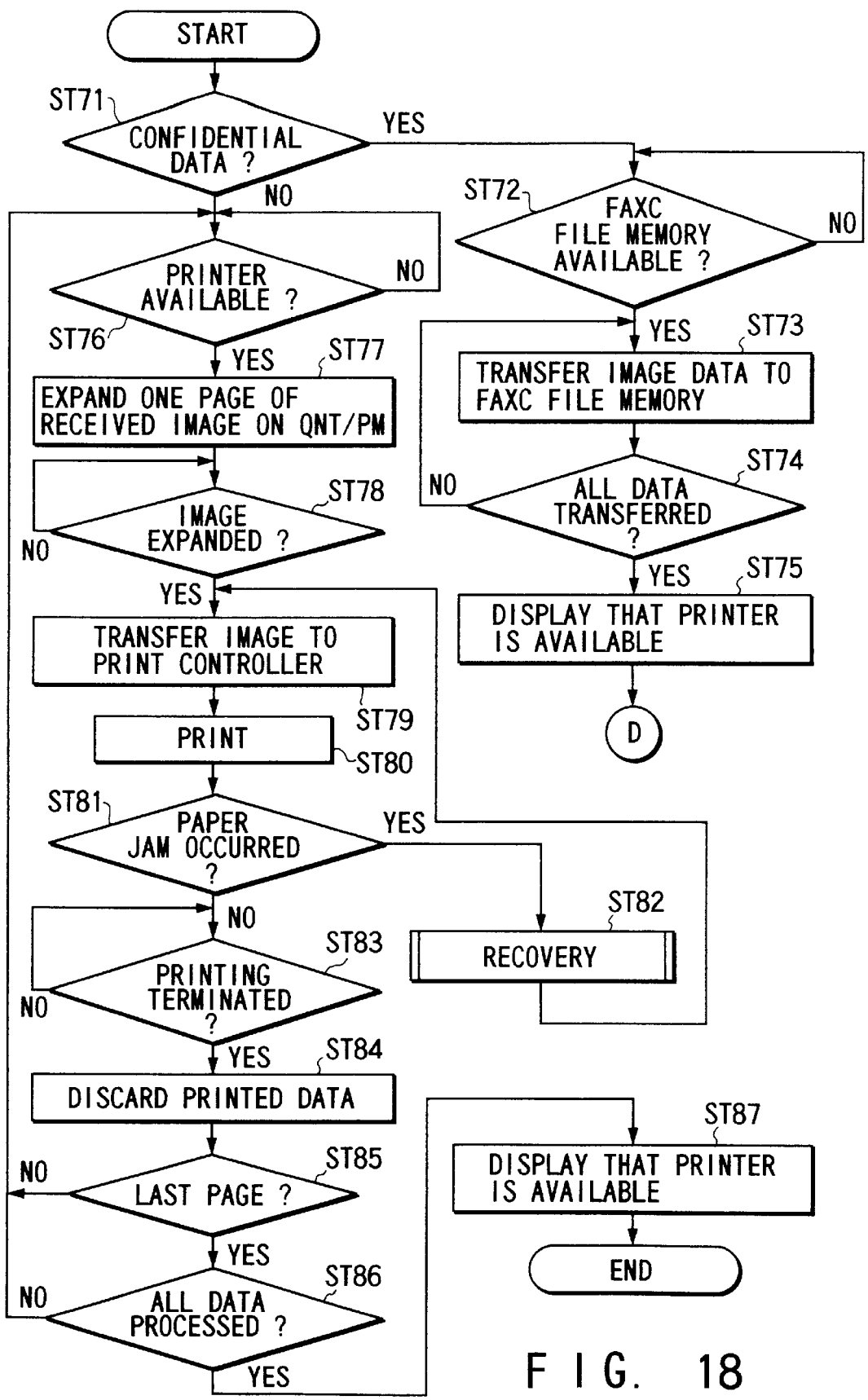
F I G. 18

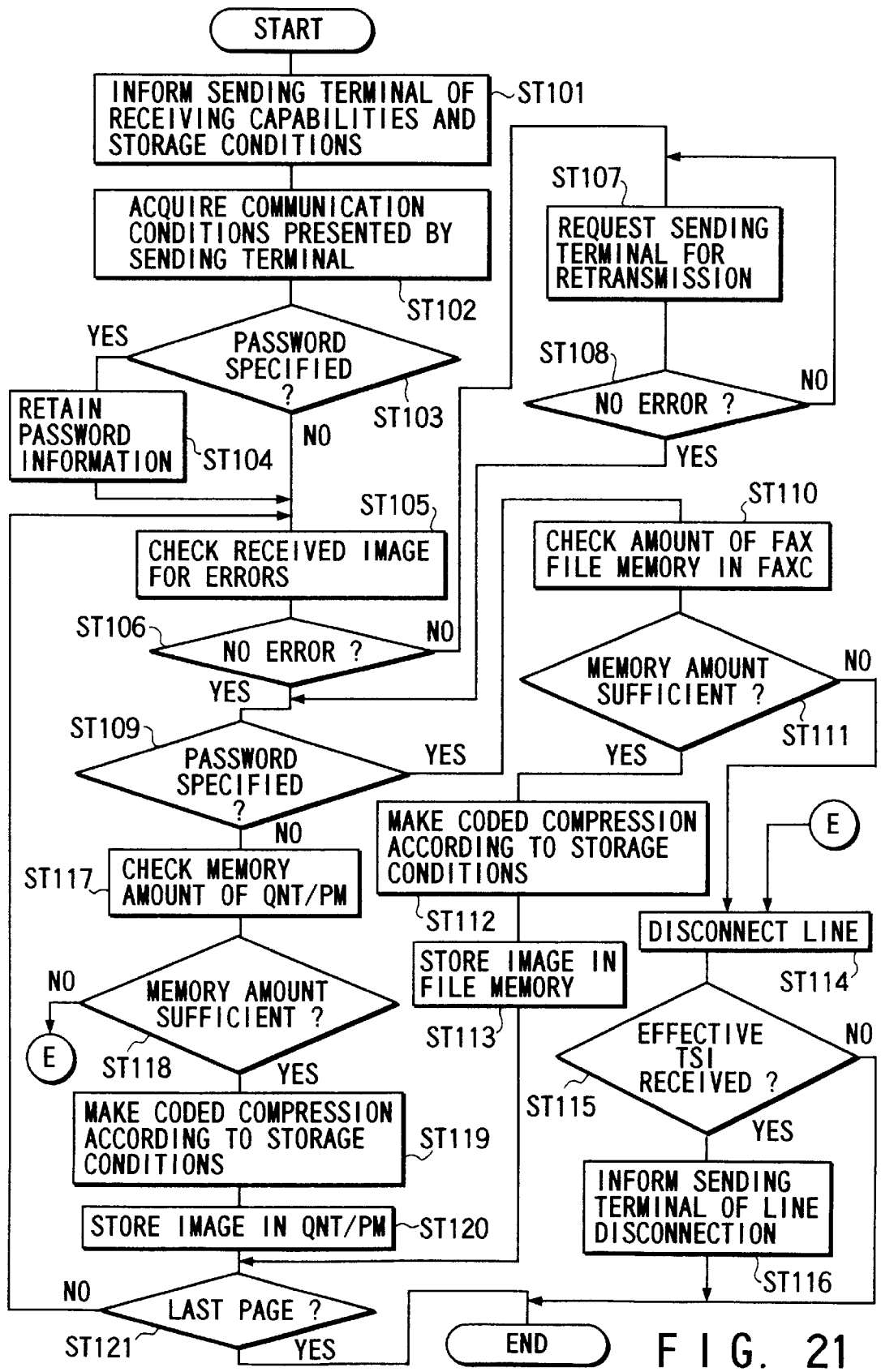
F I G. 21

IMAGE PROCESSING APPARATUS HAVING FACSIMILE FUNCTION

BACKGROUND OF THE INVENTION

The present invention relates to a digital type of composite image processing apparatus into which a plurality of image processing devices, such as an image communications device which sends or receives image information or other data over a network, an image input device such as a scanner, a printing device, an image storage device, an image editing device, etc., are integrally incorporated, and more specifically to an image processing apparatus which has at least a facsimile function built in.

In recent years, digital complex image processing apparatuses—the so-called multifunction copying machines—have been developed actively, which integrally incorporate various image processing devices, such as an image input device such as a scanner, an image storage device such as a hard disk or optical disk, an image communications device using a facsimile or network, a printer, an image editing device, etc. Conventionally, these apparatuses use an image memory dedicated to fax data storage.

Normally, a received image is stored in an image memory and then read immediately for printing. The image in the memory is subsequently erased. Accordingly, all the free space of the image memory will not be occupied by received data and failure to receive due to insufficient amount of memory seldom occurs.

However, if a problem arises in security when fax data received at night is printed out as it is, it is required to preserve all fax data received at night without being printed out. In such a case, a situation may occur in which the image memory becomes full of image data received at night, resulting in failure to receive.

Such a situation does not occur so frequently even with conventional digital composite image processing apparatuses having a function of storing data received at night in an image memory.

This is mainly due to the fact that the amount of memory required to store a page of received data is not so large because the resolution of image data handled so far is not so high.

In recent years, however, the quality of faxes has been improving and the resolution has a tendency to become very high. With improving image quality, photo images may be transmitted with quasi-halftones added. And transmission in color has also been progressing. For this reason, fax image data has a tendency to increase in size and hence it is becoming difficult to store all data received at night in a memory dedicated to fax reception.

Means for solving these problems include increasing the size of memory for fax reception and preparing a large-capacity external storage.

However, for example, providing a large-capacity memory which is not much needed usually for the purpose of adapting to a special situation such as night will reduce the efficiency of the resource utilization in the apparatus and increase the cost of the apparatus.

Thus, even if fax quality, such as resolution, improves and fax image data increases in size, it is required to store all data received at night from the standpoint of security. However, the conventional memory dedicated to fax reception has limited storage capacity. An insufficient amount of memory may result in failure to receive, causing line disconnection.

The provision of a large-capacity dedicated memory results in an increase in cost and decreased efficiency of memory utilization in the whole apparatus.

BRIEF SUMMARY OF THE INVENTION

It is accordingly an object of the present invention to provide an improved image processing apparatus having a memory for storing received image data.

It is another object of the invention to provide an image processing apparatus which prevents the occurrence of line disconnection due to insufficient capacity of a memory dedicated to fax reception in the receive data storage mode in the night and ensures both of improved security and increased efficiency of memory utilization.

According to an aspect of the invention there is provided an image processing apparatus having a facsimile control function used in first and second operation modes and an image processing function other than the facsimile control function, the apparatus comprising: first storage means for storing facsimile received data handled by the facsimile control function used in the first operation mode; second storage means for storing image data handled by the image processing function; and means for controlling so that the first storage means stores the facsimile received data when the facsimile control function is used in the first operation mode and so that the second storage means stores the facsimile received data when the facsimile control function is used in the second operation mode.

According to another aspect of the invention there is provided an image processing apparatus having a facsimile control function and an image processing function other than the facsimile control function, the apparatus comprising: first storage means for storing facsimile received data handled by the facsimile control function; second storage means for storing image data handled by the image processing function; first control means for controlling so that the second storage means stores the facsimile received data when the image processing apparatus is not used for the image data processing function; and second control means for controlling so that, when the image processing apparatus starts the image data processing function, the facsimile received data stored in the second storage means is transferred to the first storage means and the facsimile received data in the second storage means is erased.

According to still another aspect of the invention there is provided an image processing apparatus having a facsimile control function and an image processing function other than the facsimile control function, the apparatus comprising: first storage means for storing facsimile received data handled by the facsimile control function; second storage means for storing image data handled by the image processing function; operating means for setting the image processing apparatus to perform the image processing function; and means for controlling so that the first storage means stores the facsimile received data during a time zone when both the facsimile control function and the image data processing function are used and so that the second storage means stores the facsimile received data in the second storage means during a time zone when the image processing apparatus is set by the operating means not to perform the image data processing function.

According to a further aspect of the invention there is provided an image forming apparatus having a facsimile control function and a copying function, comprising: a first image memory used for the facsimile control function; a second image memory used for the copying function; and switching means for allowing the second image memory to store facsimile received data received by the facsimile control function when the image forming apparatus is not used for the copying function.

According to a further aspect of the invention there is provided an image forming apparatus having a facsimile control function and an image forming function, the apparatus comprising: first storage means for storing facsimile received data handled by the facsimile control function; means for reading a original to generate image data for the image forming function; second storage means for storing image data generated by the reading means; means for forming an image on an image bearing member on the basis of one of the facsimile received data in the first storage means and the image data in the second storage means; and means for controlling so that the first storage means stores the facsimile received data during a time zone when both the facsimile control function and the image forming function are used and so that the second storage means stores the facsimile received data during a time zone when the facsimile control function is used and the image forming function is not used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a simplified block diagram of a multifunction copying apparatus according to a first embodiment of the present invention;

FIG. 2 is a perspective view illustrating an exterior of the copying apparatus of FIG. 1;

FIG. 3 is a sectional view of the copying apparatus of FIG. 1;

FIG. 5 shows the operating panel of the copying apparatus of FIG. 1;

FIG. 7 is a diagram for use in explanation of the control procedure for a standard G3 fax communications protocol;

FIG. 8 is a diagram for use in explanation of the control procedure for a standard G3 fax communications protocol;

FIG. 9 is a diagram for use in explanation of the control procedure for a standard G3 fax communications protocol;

FIG. 10 shows the entire arrangement of functional blocks in the first embodiment of FIG. 1;

FIG. 12 is a diagram illustrating the concept of the fax receive data storage operation in the first embodiment;

FIG. 14 shows an example of a menu displayed on the touch panel display in the operating panel in the first embodiment;

FIG. 15 is a flowchart for the control procedure of a receive mode 1;

FIG. 18 is a flowchart for the receive data printing procedure in the receive mode 2;

FIG. 21 is a flowchart for the control procedure of the receive mode 2 using the G3 fax communications protocol shown FIG. 19.

DETAILED DESCRIPTION OF THE INVENTION

Figure 4:
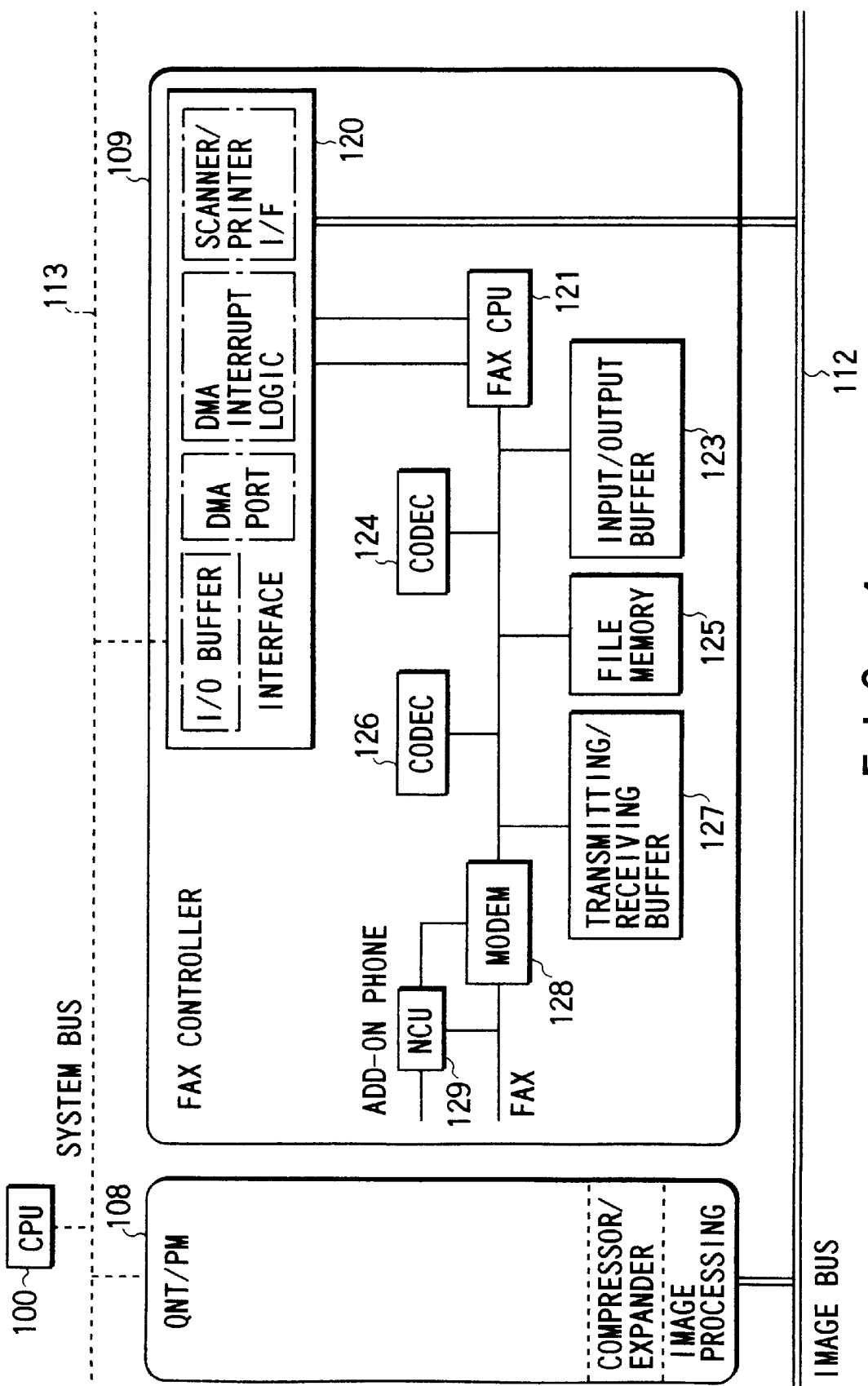
FIG. 4 is a block diagram of the fax controller of FIG. 1.

Hereinafter, an embodiment of the present invention will be described with reference to the accompanying drawings.

FIG. 2 shows the exterior of a multifunction copying apparatus as an image processing apparatus of the present invention. In this figure, reference numeral 1 denotes the body of the multifunction copying apparatus and 5 denotes an operating panel placed in the front of its top.

On the right-hand side of the apparatus of FIG. 2 are provided paper feed cassettes 6a and 6b, a large-volume feeder 6c, and power switches A and B which will be described later in detail. On the left side of the apparatus is provided a sorter 7 into which a sheet of paper formed with an image is discharged.

On the front of the apparatus below the operating panel 5 is provided a slot 8 into which an optical disk is inserted, the disk being used to store document information, etc.

On the top of the apparatus 1 is provided a glass plate consisting of transparent glass on which an original document to be copied is placed. On the glass plate is openably mounted a return auto document feeder (RADF) 10 which doubles as a document holding cover and automatically feeds sheet-like original documents, set with their reverse side faced upward, one at a time.

FIG. 3 is a schematic illustration of the copying apparatus 1, which includes a scanner 2, a laser printer 3, and an optical disk unit 4.

The scanner 2 is constructed from the return auto document feeder 10 and an exposure unit 15 comprised of a first carriage 11, a second carriage 12, an image forming lens 13, and a CCD sensor 14. The exposure unit serves as a read unit.

In FIG. 3, an original document is placed on the glass plate 16 with its printed surface faced downward. (The document is placed with its center aligned with the center line of the glass plate along its lateral line.) The document is pressed against a carrying belt 18 of a paper carrying unit 17 in the RADF 10 and irradiated with light by a fluorescent lamp 19. The reflected light from the document is directed onto the CCD sensor 14 having an array of photodetectors through mirrors 20, 21 and 22 and the image forming lens 13.

The first carriage 11 that is equipped with the mirror 20, a light sensor 19a for detecting the amount of light of the fluorescent lamp 19, and a heat insulating heater (not shown)

which keeps the temperature of the fluorescent lamp 19 constant and the second carriage 12 equipped with the mirrors 21 and 22 are moved at a relative speed of 2 to 1. The first and second carriages are moved by a scanning motor (not shown) from left to right to thereby make a subscan. The subscanning speed is changed according to a read magnification by switching the excitation method of a two-phase pulse motor between ½-phase driving and microstep driving. In a low-speed range in particular, a pulse motor driver (not shown) is arranged to input a current waveform that offsets the natural oscillation of the driving system into the pulse motor.

In the above manner an image on the document placed on the glass plate 16 is read on a line-by-line basis.

When double-sided documents are read through the use of the RADF 10, the documents are placed on a document feeding plate 23 and this is detected by a document sensing switch 24, so that the apparatus goes into the RADF mode. The documents are taken by a pickup roller 25 and then carried separated one by one by a paper feeding roller 26 and a separating roller which are rotated in the opposite directions. The document has its position aligned by an aligning roller 27 and then is sent to the transportation unit 17.

Further, the document is carried by the carrying belt 18 until it bumps against a document stopper 28, i.e., to the read reference location. At this point, the document is read in the above-described manner. After that, the belt 18 is moved in the opposite direction, so that the document is returned to a reversing gate 30 of the RADF 10. At this point, the reversing gate has been rotated to such a position as allows the document to be sent to a reversing roller 31a. Consequently, the document is caused by reversing rollers 31a, 31b and 31c to pass through reversing guides 31a, 31e and 31f, so that it is reversed and then arrives at aligning rollers 31g.

The document has its position aligned by the aligning roller 31g and is then sent to the transportation unit 17, so that it is carried to the read reference position by the carrying belt 18. After the rear side of the document has been read, it is carried by the carrying belt 18 until it arrives at paper discharging rollers 38. The document is then discharged by discharging rollers 38 and 39 and then placed on a document discharge tray 40. By repeating a set of operations described above, double-sided documents can be read successively.

The optical disk unit 4 is constructed from an optical disk drive 41, an optical disk drive motor 42, a read head (not shown), an optical disk drive controller 43, and a disk load sensor (not shown) for sensing the optical disk 41 being inserted (loaded) into that unit through the disk slot 8 provided on the front of the copying apparatus 1.

The laser printer 3 comprises an image forming unit 46 that uses a laser optical system 45 and an electrophotographic printer that allows images to be formed on both sides of copying paper in combination.

Image data output from the scanner 2 is processed by an image processing circuit to be described later and then drives a semiconductor laser oscillator (not shown) to emit a beam of laser light 47. The laser light is shaped by a beam shaping optical system (not shown) consisting of, for example, a cylindrical lens and then deflected by a polygon mirror 49 that is rotated by a polygon motor 48 using air bearing. The deflected laser light passes through an fo lens 50 and is then reflected by mirrors 51 and 52 through a protective glass sheet 53 onto a photosensitive drum 54, so that a spot of image having a required resolution is formed at an exposed location 55 on the drum 54. The photosensitive drum is scanned by the laser light, so that a latent image is formed on it. The laser light is detected by a beam detector (not shown) comprising a photodiode to produce a printer image synchronization signal (P-HSYNC).

Around the photosensitive drum 54 are placed a charger 56 for electrifying the surface of the drum, a developer 57, a transfer roller 58, a cleaner 59, and a discharger lamp 60.

The drum 54 is rotated by a motor (not shown) at a peripheral speed of V0 and its surface is electrified by the charger 56 opposed to the drum and then formed with a latent image by the laser light 47. The drum formed with the latent image is rotated to reach a development location 61 where the latent image is developed by the developer 57 to form a tonor image. The drum formed with the tonor image continues to rotate and reaches a transfer location 62 where the tonor image is transferred by the transfer roller 63 to a sheet of copying paper P supplied in a timely manner by the paper supply system. Unwanted toner attached to the transfer roller 58 is removed by a transfer roller cleaner 64.

The paper supply system comprises a first supply system which allows copying paper to be selectively supplied from the two paper feed cassettes 6a and 6b and the large-volume paper feeder 6c and a second supply system which is a reverse paper supplier that reverses a sheet of copying paper P after it has been formed with an image on its first side (the front side) and refeeds it to form an image on its rear side.

Copying paper P in the cassette 6a or 6b or the feeder 6c begins to be fed by the pickup rollers 68 (or 69, or 70) and continues to be fed by the feed rollers 71 (or 72, or 73) and the separating rollers 74 (or 75, or 76) sheet by sheet. The paper P subsequently arrives at register rollers 78 and is then supplied to the transfer unit in a timely manner. The register rollers 78 are rotated by a register motor (not shown).

An elevator 79 in the large-volume feeder 6c ascends or descends according to the number of sheets of paper so that the paper will reach a substantially constant height all the time.

Downstream of the transfer roller 58 are placed a paper carrying mechanism 80, a fixing device 81, a route switching guide 82, and paper discharging rollers 83. The route switching guide 82 switches the route of copied paper P between AA and BB. When the guide is placed in the position shown, the copied paper is guided to the route AA, so that it is discharged onto the sorter 7 through the discharging rollers 83. On the other hand, when the copied paper is guided to the route BB, it is carried to the reverse paper supply system.

FIG. 1 is a block diagram of the control system of the multifunction copying apparatus as an image processing apparatus according to an embodiment of the present invention.

The copying apparatus 1 includes a CPU 100, a ROM (for program storage and database) 101, an NVRAM 102, a DRAM (for work and data storage). The CPU 1 controls the whole copying apparatus 1 and here controls each function as instructed by the operator through the operating panel 5. Depending on a situation, as when large amounts of image data are handled, a hard disk drive or an MO drive may be installed.

A scanner interface (SIF) 104 receives image data from a scanner 2. An image processing unit (IPU) 105 performs a process of improving the image quality according to a recording device and image editing processes of enlarging/reducing images, removing selected pixels, removing white from an area designated by a marker, etc. A printer interface (PIF) 106 transfers image data to the laser printer 3.

A page memory (PM) 107 stores each pixel in many bits, and a QNT/PM (QNT: quantization, PM: page memory) 108 is an encoder/decoder that comprises a binary page memory which stores multi-valued data in binary form for recording, an expander/compressor, and various image processing ASICs.

A fax controller (FAXC) 109 comprises a modem serving as an interface which makes a connection to a public line in accordance with the facsimile procedure to be described later in detail, a sending/receiving buffer, a file memory for storing fax image data, a CODEC (coder/decoder) for coding/decoding images, performing resolution conversion, etc., and a fax CPU for controlling these units and communicating with the CPU 100.

A LAN network controller (LANC) 110 includes interface to the Ethernet and a CPU for controlling the N company network protocol. One end of the LAN cable is connected to network forming equipment such as a router/repeater.

A shared RAM 11 is provided which temporarily stores various pieces of information.

Those devices are interconnected by an image bus 112. Control signals are transferred between the CPU 100 and each device over a system bus 113 at high speed.

The image bus 112 is particularly provided for the time the multifunction apparatus 1 is used as a copying apparatus. To ensure that the apparatus operates as a copying apparatus in real time, the image bus 112 allows concurrent operations of the scanner interface 104 to receive image data from the scanner 2, the image processing unit 105 to perform image quality enhancement processing, enlargement/reduction processing and edit processing, and the printer interface 3 to output image data to the laser printer 3. Of ports connected to the image bus, ports that are unnecessary for the operations at that time will be passed through. For example, the QNT/PM 108 is passed through at the time of mere copying operation because it is unnecessary. When a plurality of images are edited using a memory, the QNT/PM 108 is needed as a binary-coding page memory.

FIG. 4 shows an example of a hardware implementation of the fax controller 109. In the apparatus of the present embodiment, under certain operating conditions, fax data to be transmitted is sent from the scanner 2 to an interface 120 in the fax controller 109 over the image bus 112 and then stored in an input/output buffer 123. The stored data is coded/compressed in a CODEC 124 and then stored in a file memory 125.

A line is chosen by a network control unit (NCU) 129. The transmit data has its coding form/resolution tailored to the capabilities of the destination station in a codec 126 and is then transmitted from a modem 128 via a transmit/receive buffer 127. At this point, a transmission header is also added in the codec 126.

A fax communications control command is DMA (Direct Memory Access) transferred from the CPU 100 in the copying apparatus 1 to the interface 120 in the fax controller 109. A fax CPU 121 in the fax controller 109 executes that command and DMA transfers a status or request from the interface 120 to the CPU 100.

On the basis of the command, the fax CPU 121 outputs onto the line a control signal (conforming to ITU-T/T. 30) based on the standard protocol. The CPU 100 outputs the next instruction according to the status or request contents.

In reception, on the other hand, received data is temporarily stored in the transmit/receive buffer 127 in the fax controller 109 and checked for errors. After that, the data is converted to a specific coding form and then stored in the file memory 125 in the fax controller 109.

The stored data is decompressed in the codec 124 and then developed into the input/output buffer 123. The data is subsequently sent from the interface 120 to the laser printer 3 over the image bus 112, so that it is printed out.

FIG. 5 shows an arrangement of the operating panel 5, which includes a touch panel display 130, a start key 131, a stop key 132, a clear key 133, a 10-key pad 134, a cassette key 135 for making a selection among document sizes/cassettes, a cassette display (LED) 136 that displays a selected document size/cassette, a size key 137 that makes a selection among paper sizes, a paper size display (LED) 138 that displays a selected paper size, and a copy number display (LED) 139 that displays the set number of copies.

For example, the "5" key in the 10-key pad 134 is pressed to obtain five copies. As a result, the number "5" is displayed on the copy number display 139. After making sure that the number of copies is set correctly, the user sets a document to be copied and presses the start key 131, whereby a copying operation is started.

Figure 6:
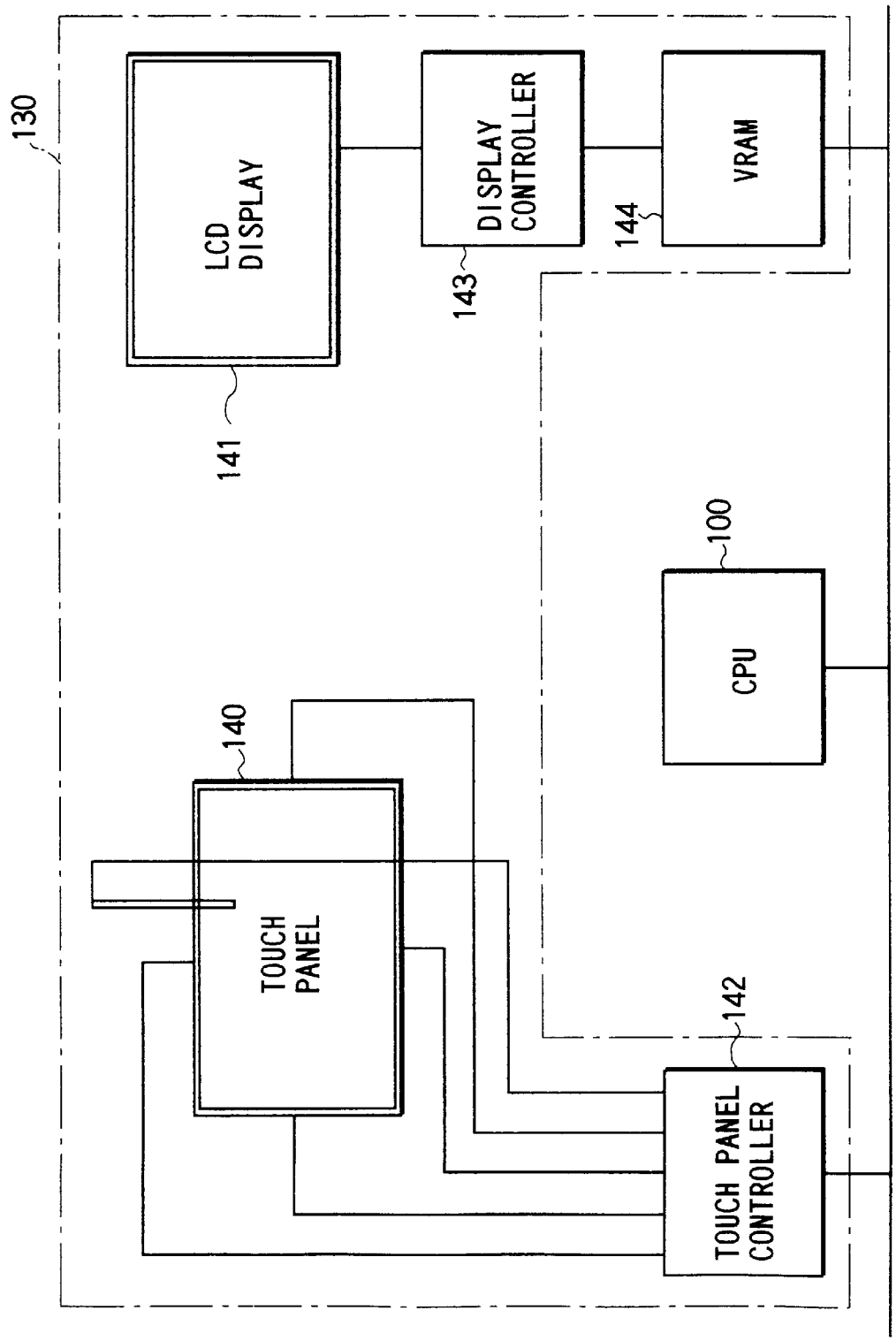
FIG. 6 shows in block diagram form the touch panel and the liquid crystal display in the operating panel.

FIG. 6 shows an arrangement of the touch panel display 130, which comprises a touch panel 140 and a liquid crystal display 141, the latter sitting beneath the former. The touch panel 140 has a transparent substrate that is uniformly coated with a transparent resistive layer and formed with transparent electrodes which are equally spaced in the X and Y directions. The touch panel 140 is scanned by a touch panel controller 142 so that each electrode is impressed with a voltage in time sequence. The touch panel is touched by a special conductive pen or finger. The touch panel controller 142 monitors resistance between each electrode in the X and Y directions and detects a place on the touch panel where resistance is locally decreased by being touched by the pen or finger on the basis of calculations from resistance values between each electrode.

Connected with the liquid crystal display 141 are a display controller 143 for driving the display and a video RAM (VRAM) 144 that stores display data pixel by pixel.

In the touch panel display 130 thus arranged, position data sought by the touch panel controller 142 is read by the CPU 100. The CPU executes processing accordingly. For example, when a handwriting entry is made, data in that location in the VRAM 144 which corresponds to a position on the touch panel 140 which is specified by the pen or finger is changed from a non-display state to a display state. The touch panel display has a wide range of applications, such as entry of an operating parameter through a selection from a keyboard and various setting buttons displayed on the liquid crystal display 141.

FIGS. 7, 8 and 9 show the flow of a standard G3 facsimile communications protocol used with the copying apparatus 1. Here, a non-error correction mode is illustrated by way of example. As the flow of communications protocol, the error correction mode basically remains unchanged from the non-error correction mode.

FIG. 7 shows an example of a transmission of only one page of data. As shown here, the facsimile communications protocol consists of five phases of A (calling), B (initialization), C (data transmission), D (transmit data confirmation), and E (disconnection).

Abbreviations shown in FIG. 7 represent operations or signals defined in Recommendation T.30.

First, in the calling phase A, a ringing tone (CNG) having a frequency of 1100 Hz and a duration of 500 msec is sent from a calling terminal to a called terminal. In response to this, the called terminal returns a called station identification signal (CED) of 2100 Hz to the calling terminal.

Next, in the initialization phase B, a nonstandard function signal/calling station identification signal/digital identification signal (NSF/CSF/DIS) is sent from the called terminal to the calling terminal. The nonstandard function signal (NSF) is a coded signal represented by "0000 0100". The calling station identification signal (CSI) is a coded signal represented by "0000 0010". The digital identification signal (DIS) is a coded signal represented by "0000 0001".

Upon receipt of those signals, the calling terminal sends a transmitting station identification signal/digital command signal (TSI/DCS). The transmitting station identification signal (TSI) is a coded signal represented by "X100 0010", and the digital command signal (DCS) is a coded signal represented by "X100 0001".

As TRAINING signals, a training check signal (TCF) consisting of successive 0s during a time interval of 1.5 seconds is sent from the calling terminal. In response to this, the called terminal sends a ready-to-receive confirmation signal (CFR) represented by "X010 0001".

Next, a transition is made to the phase C, so that TRAINING signal transmission of a series of "0" signals is followed by data transmission.

Next, a transition is made to the phase D, so that the calling terminal sends an end-of-procedure signal (EOP) represented by "X111 0100" so as to confirm the transmission of data, and, in response to this, the called terminal sends a message confirmation signal (MCF) represented by "X011 0001".

Finally, in the phase E, the calling terminal sends a disconnection command signal (DCN) represented by "X101 1111" so as to disconnect the communication. As a result, all the fax transmitting operations are terminated.

FIG. 8 shows a case where a succeeding page or pages to be transmitted are present and transmitting conditions remain unchanged. In this case, the phases A to C are the same as those in FIG. 7, but, in the phase D, the calling terminal sends a multi-page signal (MPS) represented by "X111 0010" to inform the called terminal of multi-page transmission. After the transmission of the MCF signal, phases starting with the phase C are carried out repeatedly until the final page is transmitted.

FIG. 9 shows a case where a succeeding page or pages to be transmitted are present and transmitting conditions are changed. In this case, in the phase D, the calling terminal sends an end-of-message signal (EOP) represented by "X111 0001" so as to notify the called terminal of a change of transmitting conditions. After the transmission of an MCF signal, the phase B and subsequent phases are performed repeatedly.

In the phase B (initial recognition) of each communication procedure, an NSF (nonstandard facsimile) signal is first sent from a called terminal (receiving terminal) as described above. ITU-T/T.35 prescribes that the NSF signal should exhibit a country code and a maker code. For communications between fax apparatuses manufactured by the same company, each type of apparatus is identified by that signal and communications are made based on a procedure unique to that company as opposed to the ITU-T/T.30 regulations.

Next, network transmission by the copying apparatus 1 will be described.

In the network transmission, the network transmission mode is first set on the operating panel 5. Next, information about a terminal to which data is to be sent (network address, user ID, etc.) is set. Image data to be sent is then set. The set information is placed in a transmission queue under the supervision of the CPU 100. The transmit data is edited and then subjected to coding/compression according to transmitting conditions. A line connection to the destination terminal is made according to a protocol corresponding to the network. At the termination of transmission of all pages, line disconnection processing is performed.

During this operation, the CPU 100 manages the information about the destination terminal entered from the operating panel and sets up parameters, such as image size, compression form, etc., on the scanner interface 104 and the QNT/PM 108. When an instruction to start is issued, the CPU drives the scanner 2 and then subjects input image data to resolution conversion, binary coding and compression in the image processing unit 105 and retains the resulting data in the QNT/PM 108. This operation is performed until the last page has been processed.

Next, an operation of faxing a normal original document by the copying apparatus 1 will be described.

First, the fax transmission mode is set on the operating panel 5. Alternatively, the transmission mode can be set by a terminal, such as a personal computer, via a network. The mode setting on the operating panel is made by pointing to the mode select switch displayed on the touch panel display 130. With the personal computer, the fax transmission mode is selected from a menu on the display screen.

Subsequently, on the display screen set in the fax transmission mode are set transmitting conditions including information about the receiving end (telephone number, compacted phone number, etc.), transmit document size information, scaling information for enlargement/reduction, information on the presence or absence of rotation, information as to whether the original document contains contents that should be kept privacy (confidential), etc.

For memory storage transmission, information about the receiving end is placed in the transmission queue under the supervision of the CPU 100. Transmit data entered from the scanner 2 is subjected to image processing as specified on the operating panel 5, such as enlargement/reduction, halftoning, etc., in the image processing unit 105 and then developed into binary data in the input/output buffer 123 in the fax controller 109. The transmit data is then subjected to coding/compacting in the codec 124 and then retained in the file memory 125 in the fax controller 109.

For direct transmission, the NCU 129 sets up a connection on the basis of the receiving terminal information. When the connection with the receiving terminal has been set up, image data is input from the scanner 2 to the image processing unit 105 where resolution conversion is made to suit the capabilities of the receiving terminal. Subsequently, the image data is transferred to the input/output buffer 123 in the fax controller 109 and then sent over the transmit/receive buffer 127.

After the termination of transmission of data for all pages, the line is disconnected.

Next, a description will be given of the memory-based edit function for copied images using the QNT/PM 108 in the copying apparatus 1.

Image data input from the scanner 2 is subjected to resolution conversion for a function selected by the user and binary coding in the image processing unit 105 and then stored in the QNT/PM 108. The resolution conversion for a function selected by the user corresponds to, for example, 71% reduction when the two-page input one-page output function is selected by which two original documents are reduced and fitted into a single page.

With the two-page input one-page output processing, images subjected to 71% reduction in the image processing unit 105 are read into the QNT/PM 108. After being subjected to 90-degree rotation, the two images are printed out onto a single sheet of paper.

FIG. 10 shows the control configuration of the whole copying apparatus. In this figure, an image input controller 150 comprises the scanner 2 and an image processing unit which changes image resolution and enhances the image quality.

A print controller 151 comprises an image processing unit which receives fax data and copy data, adjusts the image resolution for printing, and performs image quality enhancement processing such as smoothing.

The laser scanner 2 and the laser printer 3 are each directly controlled by a mechanism control CPU (not shown). The CPU 100 controls the scanner and the printer by sending messages to the CPUs.

A copy controller 152 comprises the page memory 107 which develops image data received from the image input controller 150 into a multi-valued image and performs image edit processing such as border erasing and an ASIC (Application Specific Integrated Circuit) which stores multiple two-value images and performs coding/decoding and other image processing in the QNT/PM 108 which performs N in 1 (N-page input one-page output) processing and rearranging of the order in which images are discharged.

An operating condition/function selection recognizing unit 153 comprises the operating panel 5. For example, when fax transmission is specified on the operating panel, it is presented to a fax communications controller 154 or the copy controller 152.

Here, the unit 153 monitors the remaining amount of memory and the operating states of the entire apparatus all the time, performs time management such as timer supervision, requests a state display unit 154 to display a message under certain conditions and switch menus, and performs operation switching control.

The state display unit 154 corresponds to the touch panel display 130 of the operating panel 5. When informed of operating states such as task termination, the occurrence of an error, etc., the CPU 100 displays this state information on the liquid crystal display 141.

A fax communications controller 155 corresponds to the fax controller 109 and hence the description thereof is omitted here.

Figure 11:
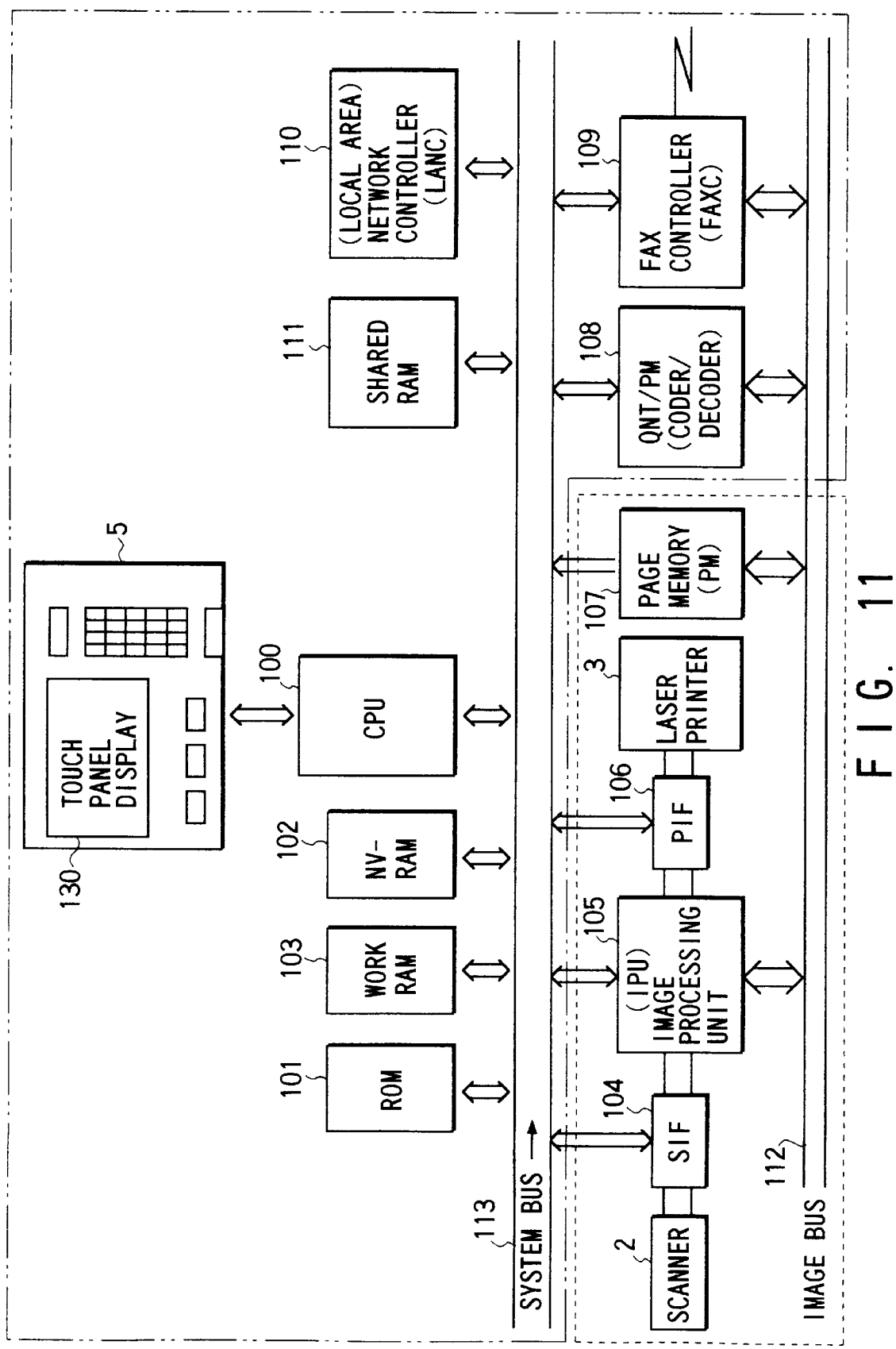
FIG. 11 is a diagram explanatory of power supply ranges.

FIG. 11 shows power supply ranges in the copying apparatus 1. When power switches A and B are both ON, power is supplied to the entire apparatus 1. When only the switch A is turned OFF, the power to the scanner 2, the laser printer 3 and the image processing unit 105 is turned OFF. In FIG. 11, the useful range of the power switch A is indicated by dashed lines, while the useful range of the power switch B is indicated by two-dot-dashed lines.

Accordingly, if, at night when the apparatus is used only for fax reception, only the power switch B is turned ON, fax reception can be achieved with power saved.

At night, a memory in the QNT/PM 108 that is originally used for editing copied images can be used for fax reception because other functions than faxing are not used.

FIG. 12 shows the concept of storage of fax receive data in the copying apparatus of the present invention.

In the normal state, i.e., when the power is ON, fax receive data is stored in the memory dedicated to fax, then printed by the printer.

At night, i.e., when the power to the units which become unnecessary at night, such as the scanner, the printer, etc., is OFF, fax receive data is stored in the memory that is used for other applications than fax. The data is printed by the printer when the power is turned ON. Confidential receive data is stored in the fax dedicated memory.

Next, reference will be made to flowcharts of FIGS. 13, 15, 16, 17, and 18 to describe an operation of switching between fax receive modes.

The switching is made only when it is definite that one or more image forming means (the scanner 2, the laser printer 3, etc.) are not used for other than fax and image memories exclusively used by these means are available.

FIG. 14 shows an example of a menu displayed on the touch panel display 130 of the operating panel 5. Reception switching methods include a method in which, on the menu, the user specifies a period of time that the copy function and the print function are not used as in the night to thereby make definite that other functions than fax are not used and a method in which the user turns OFF the power to the scanner 2 and the printer 3 to thereby make definite that other functions than fax are unavailable physically.

In the present embodiment, a description is given of control means for receive mode switching when the power to the scanner and the laser printer is OFF. Even if there are different triggering factors for receive mode switching as described above, the following processing flow may be considered to basically remain unchanged.

Figure 13:
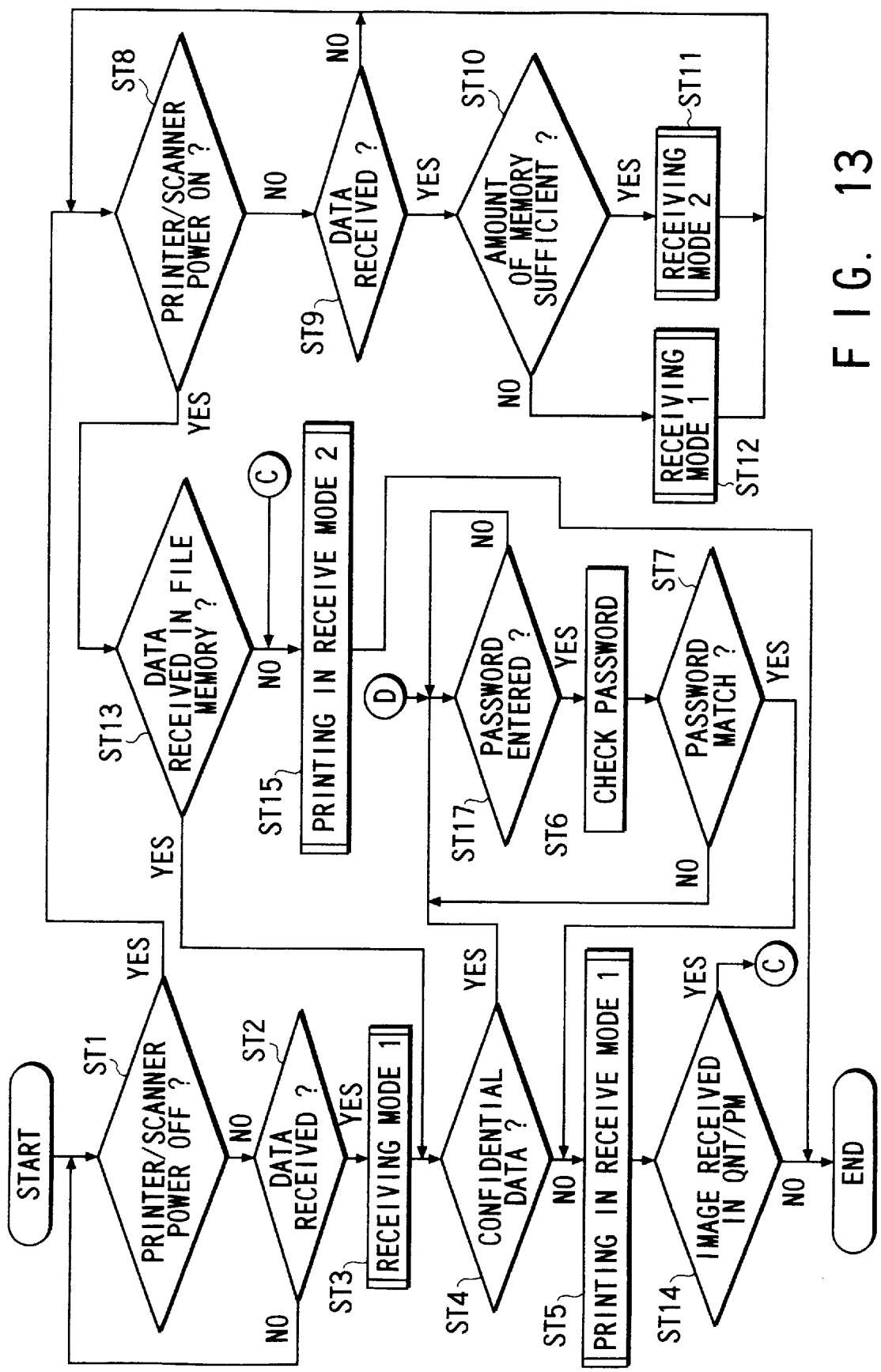
FIG. 13 is a flowchart for the overall processing operation of the apparatus of the first embodiment.

In FIG. 13, when signal reception is recognized in a state where the power to the scanner 2 and the laser printer 3 is ON (ST2), the reception is performed in accordance with the processing flow of the receive mode 1 shown in FIG. 15 (ST3).

Figure 17:
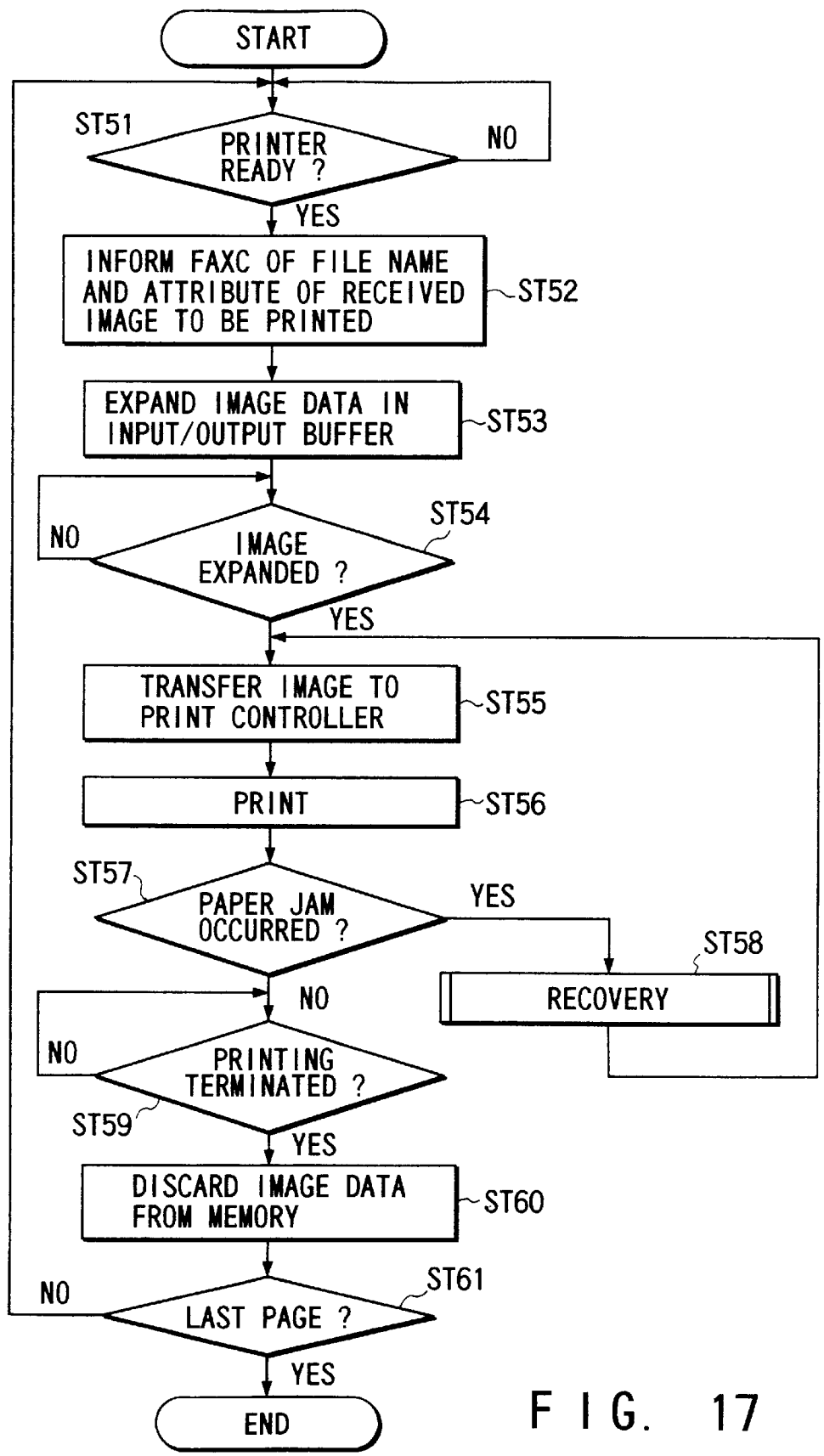
FIG. 17 is a flowchart for the receive data printing procedure in the receive mode 1.

At the termination of the reception, printing is performed in accordance with the receive and print processing flow of the receive mode 1 shown in FIG. 17 (ST5). At this point, if the received data is confidential data using a password (ST4), then a user password is entered (ST5) and checked with the received password (ST6). Printing is made only when the password match occurs (ST7).

Figure 16:
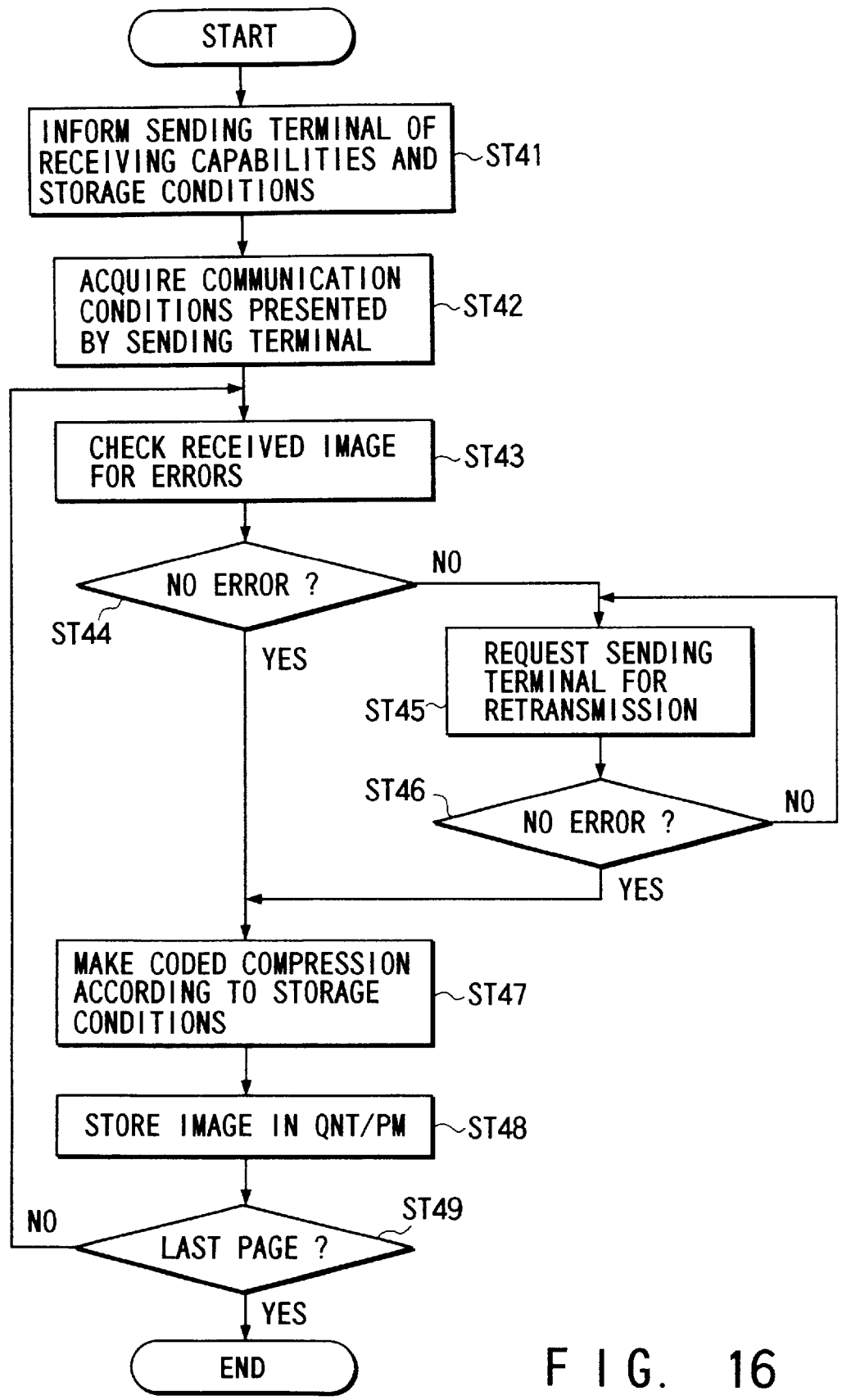
FIG. 16 is a flowchart for the control procedure of a receive mode 2.

When it is confirmed that the power to the scanner 2 and printer 3 is OFF (ST8) and signal reception is recognized (ST9), reception is performed in accordance with the processing flow of the receive mode 2 shown in FIG. 16 (ST11).

At this point, when the remaining amount of memory in the QNT/PM 108 is very small (ST10), the CPU 100 switches the receive mode to the receive mode 1 (ST12), whereby the receive data is stored in the file memory 125 in the fax controller 109.

When the power to the scanner and the printer is ON (ST8) and a received image is stored in the file memory 125 in the fax controller 109 (ST13), a decision is made as to whether the received data is confidential. If NOT, the data is printed in accordance with the flowchart for printing for the receive mode 1 shown in FIG. 17.

If, after the termination of printing of the received data stored in the file memory 125 in the fax controller 109, it is found in step S14 that the QNT/PM 108 also stores received data, the procedure goes to step ST15 (ST14).

If all the received data stored in the file memory 125 in the fax controller 109 have been printed or the file memory is not used to store any received image data, then printing is made in accordance with the flowchart for data printing for the receive mode 2 shown in FIG. 18.

At the termination of the printing, the CPU 100 displays on the operating panel 5 that other functions than fax that use the scanner and the laser printer are available.

FIG. 14 shows an example of a time setting menu which is displayed on the touch panel display 130 and used to switch the receive modes in accordance with the present invention. If, when the time zone for the normal use of the copying apparatus is set from 9:00 a.m. to 11:00 p.m., the starting time is set at 23:00 and the ending time is set at 9:00 on the menu, fax receive processing is performed only during the interval from 11:00 p.m. to 9:00 a.m. in the next day by the use of image memories which will not be used for other functions than fax during that interval.

FIG. 15 is a flowchart for the reception in the above-described receive mode 1.

When fax reception is started, the fax controller 109, a called terminal, is required to inform a calling station of its receiving capabilities in the phase B. For this reason, the CPU 100 of the copying apparatus 1 informs the fax controller 109 of the receiving capabilities and storage conditions for the file memory 125 as first storage means for storing fax image data (ST21). The receiving capabilities in this case refer to resolution, coding form, image size, and error correcting capability. The storage conditions mean resolution, coding form, file name, and image size.

Next, communications conditions presented by the transmitting station is received and a decision is made as to whether or not the reception is possible. When a TSI signal is sent, this information is acquired (ST 22). The information is displayed on the operating panel 5. When continued reception becomes impossible and consequently the line is disconnected, the information is also used to inform the transmitting station of it.

Received image data is checked for errors (ST23). In the error correcting mode (ECM), received frames are checked for errors in accordance with the HDLC (HI-LEVEL DATA LINK CONTROL) frame check sequence. In the non-error correcting mode (NECM), the bit at the end of each received image is monitored to make a decision as to whether or not each line has a predetermined number of pixels. In the case of ECM, when an error is detected even on one frame, retransmission is requested. In the case of NECM, on the other hand, a request is made to the sending station for retransmission only when a predetermined number of error lines is reached (ST25).

After being checked for errors, one block of received image data is stored in the transmit/receive buffer 127 in the fax controller 109 and then transferred to the file memory 125. Here, one block means a unit in memory management in the fax controller 109. Normally, one block corresponds to 64 Kbytes because error correction is made in units of 64 Kbytes in standardization recommendation of the ITU-T.

When the remaining amount of memory in the file memory 125 is less than one block (ST28), the received image is directly expanded/developed in the input/output buffer 123 (ST29). If the laser printer 3 is available when one page of data was developed, printing is made (ST32). If the laser printer is unavailable due to paper jam by way of example, the line is disconnected (ST33). If, in this case, an effective TSI signal has been received from the sending station, notification is made to the sending station that the line is disconnected (ST35).

If the decision in step ST28 is that the file memory has enough space, then coded compression is made according to the above-described storage conditions (ST36) and the resultant image is stored in the file memory 125 (ST37). For the coded compression in this case, the codec 124 in the fax controller 109 is used.

When the above processing is performed on the last page, the receive processing is terminated (ST38).

FIG. 16 is a flowchart for the receive mode 2.

When reception is started, the CPU 100 in the copying apparatus 1 informs the fax controller 109 of receiving capabilities and storage conditions for storage in the QNT/PM 108 as a second storage means (ST41). This is because the fax controller 109, which is the called terminal, is required to inform the calling station of the receiving capabilities. In this case, the receiving capabilities mean resolution, coding form, image size, error correcting capability, etc. The storage conditions mean resolution, coding form, file name, and image size.

Next, communications conditions presented by the sending station are received to determine if the reception is possible or not (ST42).

Image data is received and checked for errors (ST43). In the error correcting mode (ECM), received frames are checked for errors in accordance with the HDLC (HI-LEVEL DATA LINK CONTROL) frame check sequence. In the non-error correcting mode (NECM), the bit at the end of each line of each received image is monitored to make a decision as to whether or not each line has a predetermined number of pixels. In the case of ECM, when an error is detected even on one frame, retransmission is requested. In the case of NECM, on the other hand, a request is made to the sending station for retransmission only when a predetermined number of error lines is reached (ST45).

After being checked for errors, one block of received image data is stored in the transmit/receive buffer 127 in the fax controller 109 and then transferred to the QNT/PM 108 (ST48). Here, one block means a unit in memory management in the fax controller 109. Normally, one block corresponds to 64 Kbytes because error correction is made in units of 64 Kbytes in standardization recommendation of the ITU-T.

When the above processing is performed on the last page, the receive processing is terminated (ST49).

FIG. 17 is a flowchart for the printing procedure in the receive mode 1.

In starting printing, a decision is made as to whether or not the printer in the print controller is available (ST51). Here, the printer is unavailable when paper runout or paper jam occurs, or when the printer is being used for copying.

When printing becomes enabled, the fax controller 109 is informed of the file name and image attribute of the received image to be printed (ST52). Here, the image attribute refers to coding form used in storing the received image, resolution, paper size, etc. The file name is a file name attached to the received image for convenience of management of received images.

Next, notification is made to the fax controller 109 that the image will be developed in the input/output buffer 123 in the fax controller and then the CPU waits until image expansion is terminated (ST53).

When the image development is terminated (ST54), image data is transferred to the print controller 151 (ST55) and printing is made by the laser printer 3 (ST56). In the event that a paper jam occurs during printing (ST57) and the printing is not normally terminated, the image data is preserved in the input/output buffer until a recovery is made from the paper jam (ST58). The recovery means the removal of the jamming paper. This is not directly related to the present invention and hence detailed description thereof is not given here. The image data is preserved in the input/output buffer 123 until the printing is normally terminated.

At the termination of printing (ST59), the developed image is discarded (ST60).

When the above processing is performed on the last page, the printing is terminated (ST61).

FIG. 18 is a flowchart for print processing in the receive mode 2.

First, confidential image data received using a password is stored in the QNT/PM 108 (second storage means) and then moved to the file memory 125 (first storage means) in the fax controller 109 (ST73). If the image data is not completely entered into the file memory, it is left on the QNT/PM 108. At the termination of movement of all the confidential data, a message that confidential data is present is displayed on the touch panel display 130 of the operating panel 5 (ST75). The printing process of the confidential data shifts from D in FIG. 18 to D in the flowchart for the overall processing shown in FIG. 13.

In starting printing image data stored in the QNT/PM 108, not confidential data, a decision is made for each page as to whether or not the laser printer 3 in the print controller 151 is available (ST76). In the event of paper runout or paper jam, the printer is unavailable.

If the printer is available, the image data is expanded/developed in the QNT/PM 108 for each page (ST77). The developed image is transferred to the laser printer 3 (ST79), then printed (ST80). At the termination of printing, the data is discarded to free the memory (ST87).

When the processing of all the stored data is terminated, a message that copying is enabled or printer is available is displayed on the touch panel display 130 of the operating panel 5 (ST87).

That is, the above-described method indicates that other functions than fax are all made available when stored images data have been transferred to the fax controller 109 or image data have been discharged from the QNT/108 to free the memory in a state where the power is ON and the laser printer 3 becomes available.

At this point, reference will be made to FIGS. 19 and 20 to describe a G3 FAX standard protocol in the ECM mode when image data to be faxed is confidential data, namely, when a password is specified on the transmitting terminal side and a G3 FAX standard protocol in the ECM mode that involves image retransmission based on line error detection. In the following description, the same abbreviations as those in FIGS. 7, 8 and 9 indicate the same signals.

Figure 19:
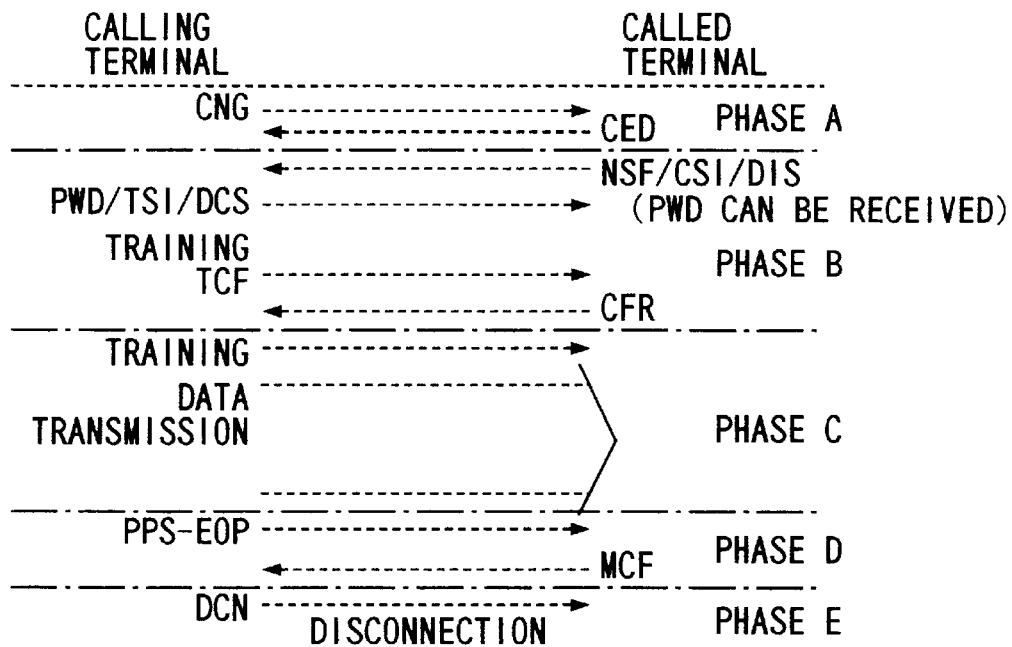
FIG. 19 is a diagram for use in explanation of the control procedure of the G3 fax communications protocol when a password is specified at a sending terminal.

In FIG. 19, signals NSF/CSI/DIS sent back from the called terminal to the calling terminal at the beginning of phase B include a signal indicating that a password (PSW) can be received.

Upon receiving this signal, the calling terminal sends PWD/TSI/DCS signals including a password to the called terminal and then sends a TRAINING signal (TCF) and receives a TRAINING signal (CFR).

After data transmission in phase C, a combined signal (PPS-EOP) of a partial page signal (PPS) represented by a code of t"X111 1101" and an end-of-procedure signal (EOP) is sent to the called terminal. In response to this signal, the called terminal sends a message confirmation signal (MCF), thereby terminating phase D. In phase E, the line is disconnected.

Figure 20:
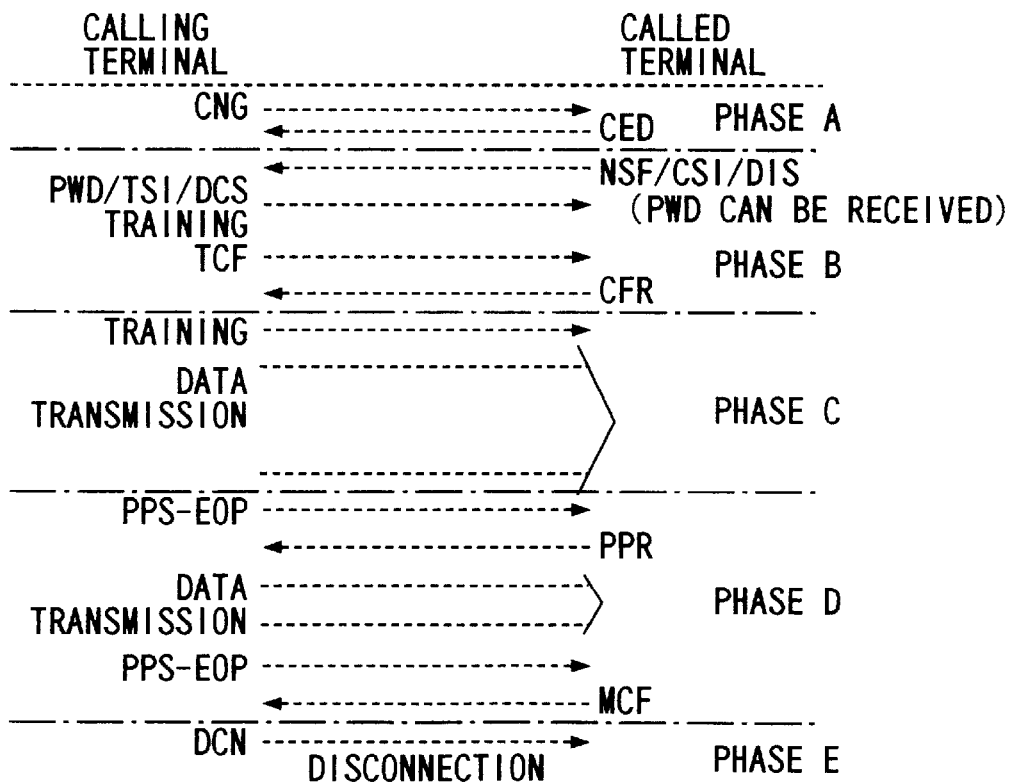
FIG. 20 is a diagram for use in explanation of the control procedure of the G3 fax communications protocol involving image retransmission based on error line detection.

When an error frame is detected in the frame check sequence at the termination of fax transmission of a portial page, communications are made in accordance with the protocol of FIG. 20 for image retransmission.

The processes including transmission of a PPS-EOP signal in phase D in FIG. 20 are the same as those in FIG. 19. When an error frame is detected in the called terminal after the transmission of the PPS-EOP signal, a partial page request signal PPR of "X011 1101" is sent to inform of an error frame number from the called terminal. Upon receiving this signal, the calling terminal resends the error frame data to the called terminal.

When data transmission is made without any error, the signal PPS-EOP and the signal MCF are transferred between the calling terminal and the called terminal as in phase D in FIG. 19, thereby terminating phase D. Phase E is started next.

Next, the other embodiment of the invention will be described with reference to FIG. 21, which is the same in basic arrangement as the first embodiment. As described in connection with FIG. 11, at night, only the power switch B is turned ON. Thus, the memory in the QNT/PM 108 for copying and editing can be used in the fax mode.

The second embodiment is arranged in such a way as to store password-protected confidential data in the fax controller 109 and store data other than confidential data in the memory of the QNT/PM 108. This is based on considerations that, first, so large an amount of confidential data will not be transmitted in a night and hence one to three megabytes of storage in the fax controller will suffice and, second, in the QNT/PM 108, the burden on memory is lightened by the amount of confidential data although the QNT/PM has 12 to 20 megabytes of storage.

In FIG. 21, when reception is started, the CPU 100 in the copying apparatus 1 informs the fax controller 109 of receiving capabilities and informs the fax controller 109 or the QNT/PM 108 of storage conditions for storing the data (ST101). This is because the fax controller 109, which is the called terminal, is required to inform the calling terminal of the receiving capabilities. In this case, the receiving capabilities mean resolution, coding form, image size, error correcting capability, etc. The storage conditions mean resolution, coding form, file name, and image size.

Next, communications conditions presented by the calling terminal are received to determine if the reception is possible or not. At this point, if a password is specified by the calling terminal, the password information is retained. The password information refers to information in the information field in the PWD signal shown in FIG. 15. This signal is sent from the calling terminal only when the called terminal informs the calling terminal that it has password capability at the time of informing the receiving capabilities.

Image data is received and checked for errors. In the error correcting mode (ECM), received frames are checked for errors in accordance with the HDLC (HI-LEVEL DATA LINK CONTROL) frame check sequence.

In the non-error correcting mode (NECM), the bit at the end of each line of each received image is monitored to make a decision as to whether or not each line has a predetermined number of pixels. In the case of ECM, when an error is detected even on one frame, retransmission is requested. In the case of NECM, on the other hand, a request is made to the calling terminal for retransmission only when a predetermined number of error lines is reached. The protocol for retransmission of error frames in the error correction mode (ECM) is illustrated in FIG. 16.

In this figure, a PPR signal is sent to the calling terminal when an error is detected. The calling terminal retransmits the error frame accordingly.

When no password specification is performed, the received images are checked for errors. When it is confirmed that the amount of memory remains for storing at least image data stored in the receive buffer, one block of received image data stored in the receive buffer in the fax controller is transferred to the QNT/PM. Here, one block means a unit in memory management in the fax controller 109. Normally, one block corresponds to 64 Kbytes because error correction is made in units of 64 Kbytes in standardization recommendation of the ITU-T.

The remaining amount of memory in the QNT/PM is checked for each page. At this point, when it is determined that the remaining amount of memory is too small to continue reception, a disconnection command is sent over the line to disconnect it. If, in this case, a TSI signal has been received from the calling terminal, the called terminal informs the calling terminal of abnormal termination of reception due to insufficient amount of memory.

With password specification, received image data is stored in the file memory in the fax controller.

At this point, the remaining amount of memory in the file memory is likewise checked. If the amount of memory remains for storing at least image data in stored in the receive buffer, then the received data is stored in the file memory.

If it is determined that the remaining amount of memory is too small to continue reception, a disconnection signal is sent over the line to thereby disconnect it. If, in this case, a TSI signal has been received from the calling terminal, the called terminal informs the calling terminal of abnormal termination of reception due to insufficient amount of memory.

When the above processing is performed on the last page, the receive processing is terminated.

As described above, according to the embodiments of the present invention, by using memories which have been known not to be used at night for fax, such as an image memory for copying, etc., the occurrence of an event of line disconnection due to insufficient amount of memory can be avoided as much as possible, security for data can be increased, and the efficiency of memory utilization can be increased.

As described above in detail, according to the present invention, an image processing apparatus can be provided which permits the occurrence of an event of line disconnection due to insufficient amount of memory to be avoided as much as possible, security for data to be be increased, and the efficiency of memory utilization to be increased.

Additional advantages and modifications will readily occur to those skilled in the art. Therefore, the invention in its broader aspects is not limited to the specific details, representative embodiments shown and described herein. Accordingly, various modifications may be made without departing from the spirit or scope of the general inventive concept as defined by the appended claims and their equivalents.

We claim:

1. An image forming apparatus having a facsimile control function and a copying function, comprising:

a first image memory used for the facsimile control function;

a second image memory used for the copying function;

switching means for allowing the second image memory to store facsimile received data received by the facsimile control function when the image forming apparatus is not used for the copying function; and means for controlling so that the first image memory stores the facsimile received data during a time zone when both the facsimile control function and the copying function are used, so that the second image memory stores the facsimile received data other than confidential data during a time zone when the image forming apparatus is set by the switching means not to perform the copying function, and so that the first image memory stores the confidential data during a time zone when no copying function is set to perform by the switching means.

2. An image forming apparatus according to claim 1, further comprising:

means for, when the image processing apparatus initiates a copying operation, printing out the facsimile received data received by the facsimile control function and stored in the second image memory under the control of the switching means by using the copying function, transferring the facsimile received data from the second image memory to the first image memory when the copying function is inoperable or that the facsimile received data must not be printed, and then erasing the facsimile received data stored in the second image memory to thereby allow the second image memory to be used for the copying function.

3. An image forming apparatus according to claim 1, further comprising:

means for, when the image processing apparatus initiates a copying operation, transferring facsimile received data received by the facsimile control function and stored in the second image memory under the control of the switching means to the first image memory and then erasing image data stored in the second image memory.

4. An image forming apparatus according to claim 1, further comprising:

means for, when the image processing apparatus initiates a copying operation, printing out the facsimile received data received by the facsimile control function and stored in the second image memory under the control of the switching means by using the copying function and then erasing the facsimile received data stored in the second image memory.

5. An image forming apparatus according to claim 1, further comprising:

means for, when the image processing apparatus initiates a copying operation, transferring the facsimile received data received by the facsimile control function and stored in the second image memory under the control of the switching means to the first image memory, printing out, by using the copying function, the facsimile received data that is left in the second image memory because the first image memory is full, and then erasing the facsimile received data stored in the second image memory to thereby allow the second image memory to be used for the copying function.

* * * * *